(12) United States Patent
Williams et al.

(10) Patent No.: US 7,688,553 B1
(45) Date of Patent: Mar. 30, 2010

(54) THERMALLY-COMPENSATING ATTACHMENT OF DISK DRIVE SLIDER TO FLEXURE

(75) Inventors: Stephen P. Williams, Morgan Hill, CA (US); Timothy A. Riener, Fremont, CA (US); Francis P. Crimi, Los Altos, CA (US); Wentao Yan, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 1272 days.

(21) Appl. No.: 11/198,000

(22) Filed: Aug. 5, 2005

Related U.S. Application Data

(60) Provisional application No. 60/599,200, filed on Aug. 5, 2004.

(51) Int. Cl.
*G11B 21/20* (2006.01)
*G11B 5/48* (2006.01)
(52) U.S. Cl. .................................. 360/245.3; 360/234.6
(58) Field of Classification Search .............. 360/245.3, 360/245.4, 245.5, 245.6, 245.7, 234.6
See application file for complete search history.

(56) References Cited

U.S. PATENT DOCUMENTS

| | | | | |
|---|---|---|---|---|
| 5,138,507 A | | 8/1992 | Zarouri et al. ........... | 360/245.3 |
| 5,377,064 A | * | 12/1994 | Yaginuma et al. ........ | 360/234.6 |
| 5,467,236 A | * | 11/1995 | Hatanai et al. ........... | 360/245.3 |
| 5,636,088 A | * | 6/1997 | Yamamoto et al. ....... | 360/245.1 |
| 5,844,751 A | | 12/1998 | Bennin et al. ............ | 360/244.3 |
| 6,801,398 B1 | * | 10/2004 | Ohwe et al. .............. | 360/245.3 |
| 2003/0007288 A1 | * | 1/2003 | Kasajima et al. ......... | 360/234.6 |
| 2003/0007290 A1 | * | 1/2003 | Kasajima et al. ......... | 360/245.4 |
| 2003/0007291 A1 | * | 1/2003 | Kasajima et al. ......... | 360/245.4 |
| 2003/0011118 A1 | * | 1/2003 | Kasajima et al. ............ | 267/141 |

* cited by examiner

*Primary Examiner*—Craig A. Renner
(74) *Attorney, Agent, or Firm*—Mikel R. Boeve

(57) ABSTRACT

A disk drive head-gimbal assembly includes a flexure that is modified to address the effects that the operating temperature of the disk drive may have on fly height. Generally, the flexure tongue is split into a leading edge flexure tongue section and a trailing edge flexure tongue section that are separated by a slider decoupling section. The slider decoupling section structurally interconnects the leading and trailing edge flexure tongue section, and further provides a reduced contact area with the slider. This reduced contact limits the ability of the flexure tongue to induce a positive crown on the air bearing surface of the slider.

16 Claims, 16 Drawing Sheets

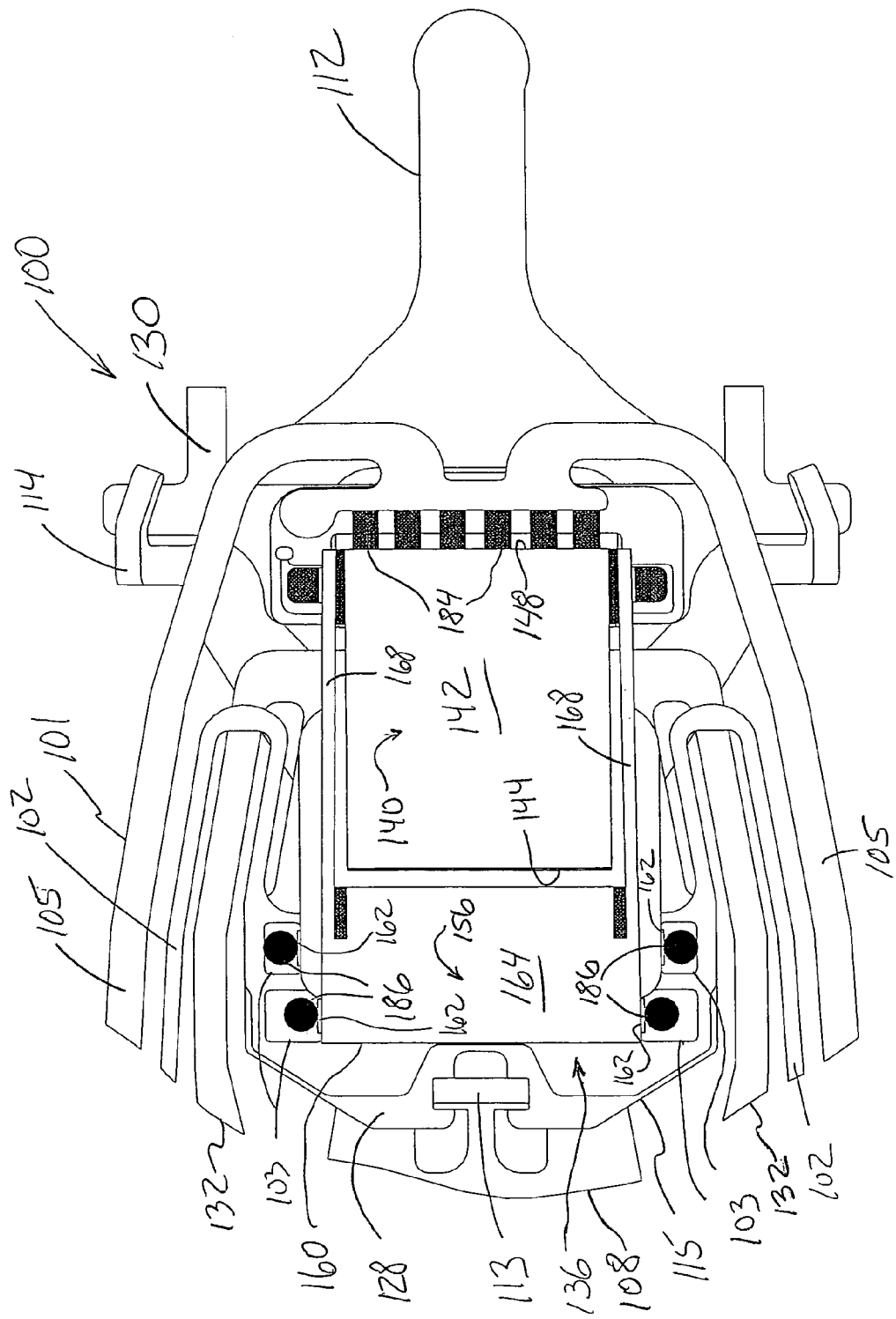

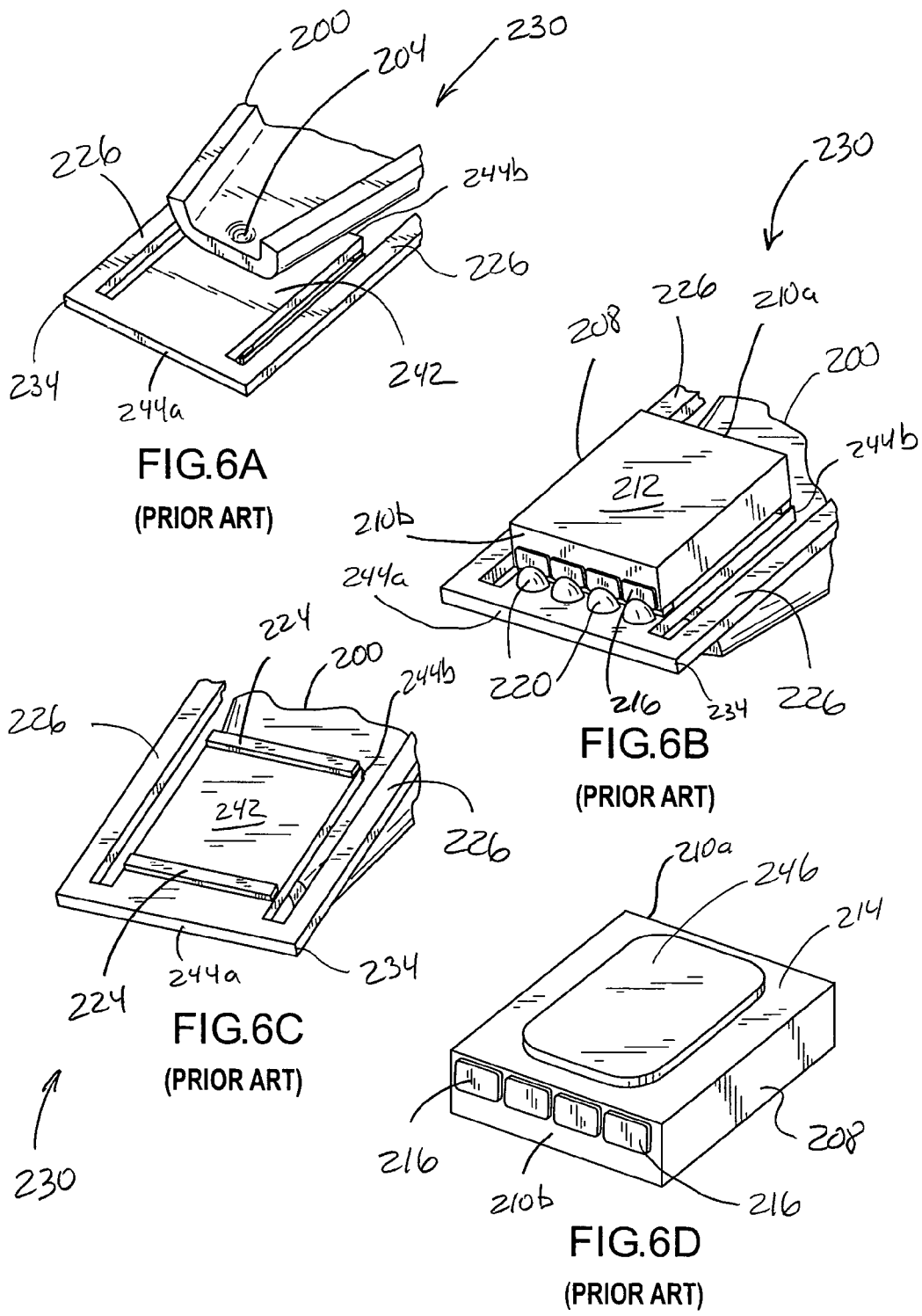

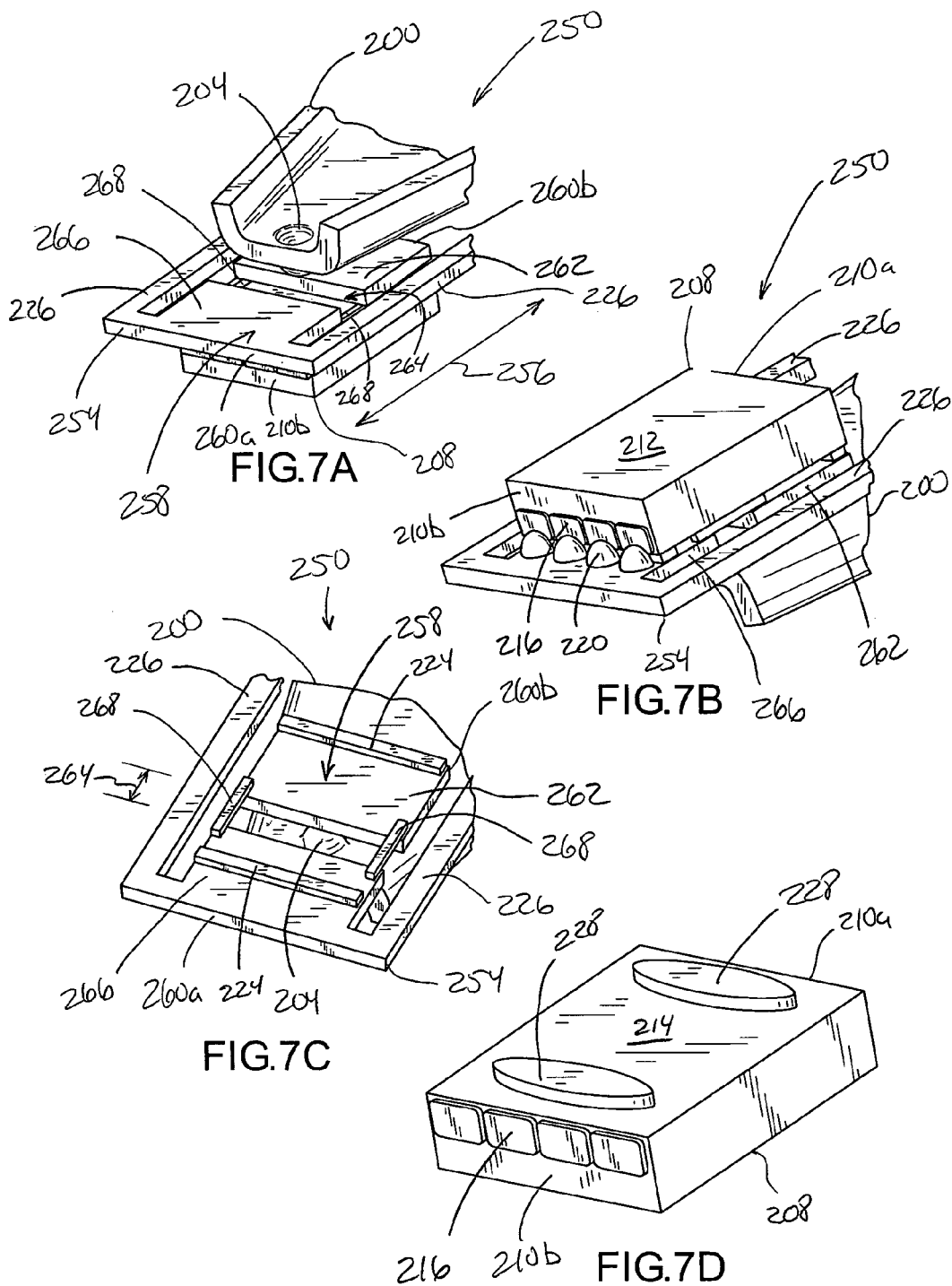

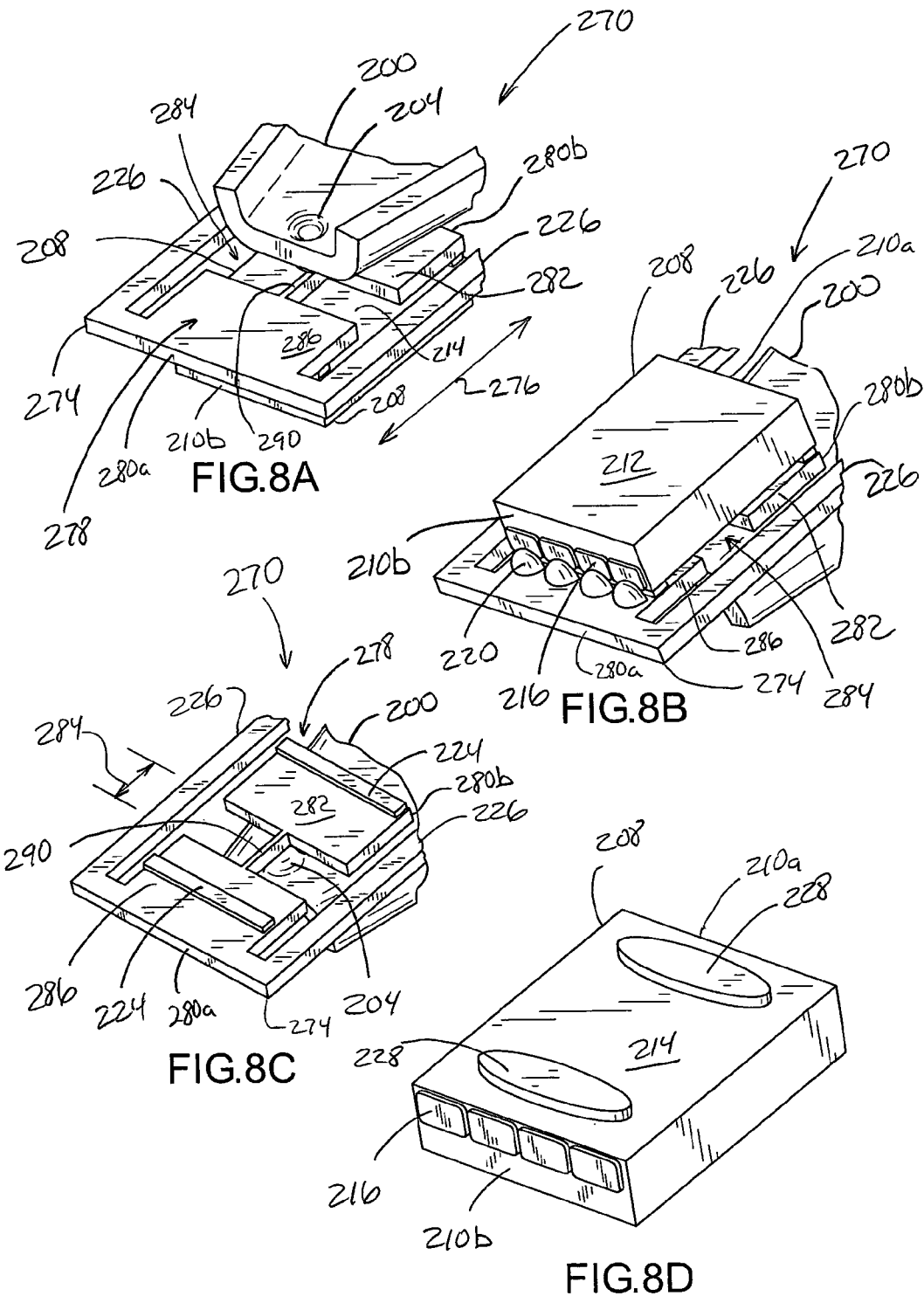

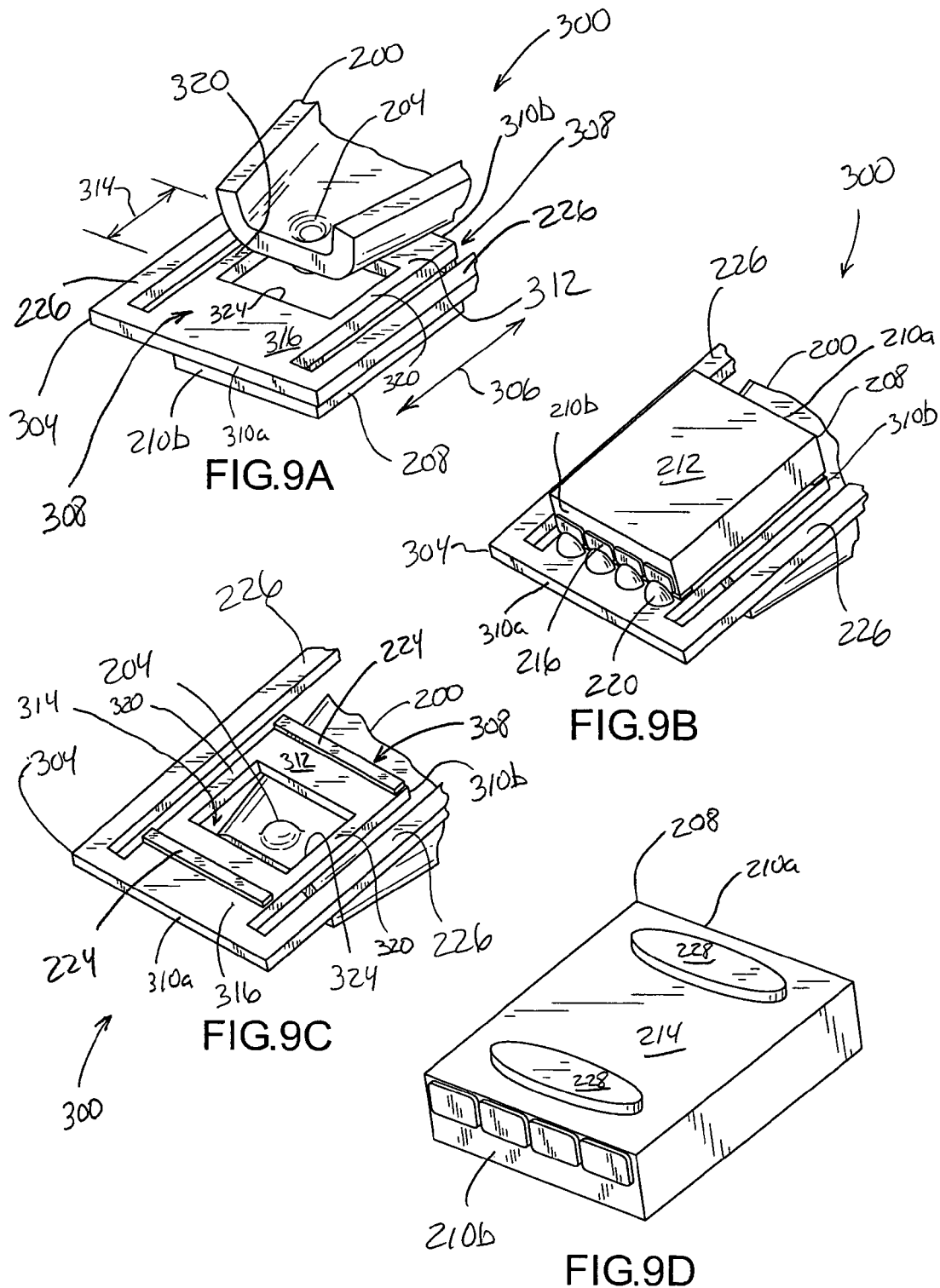

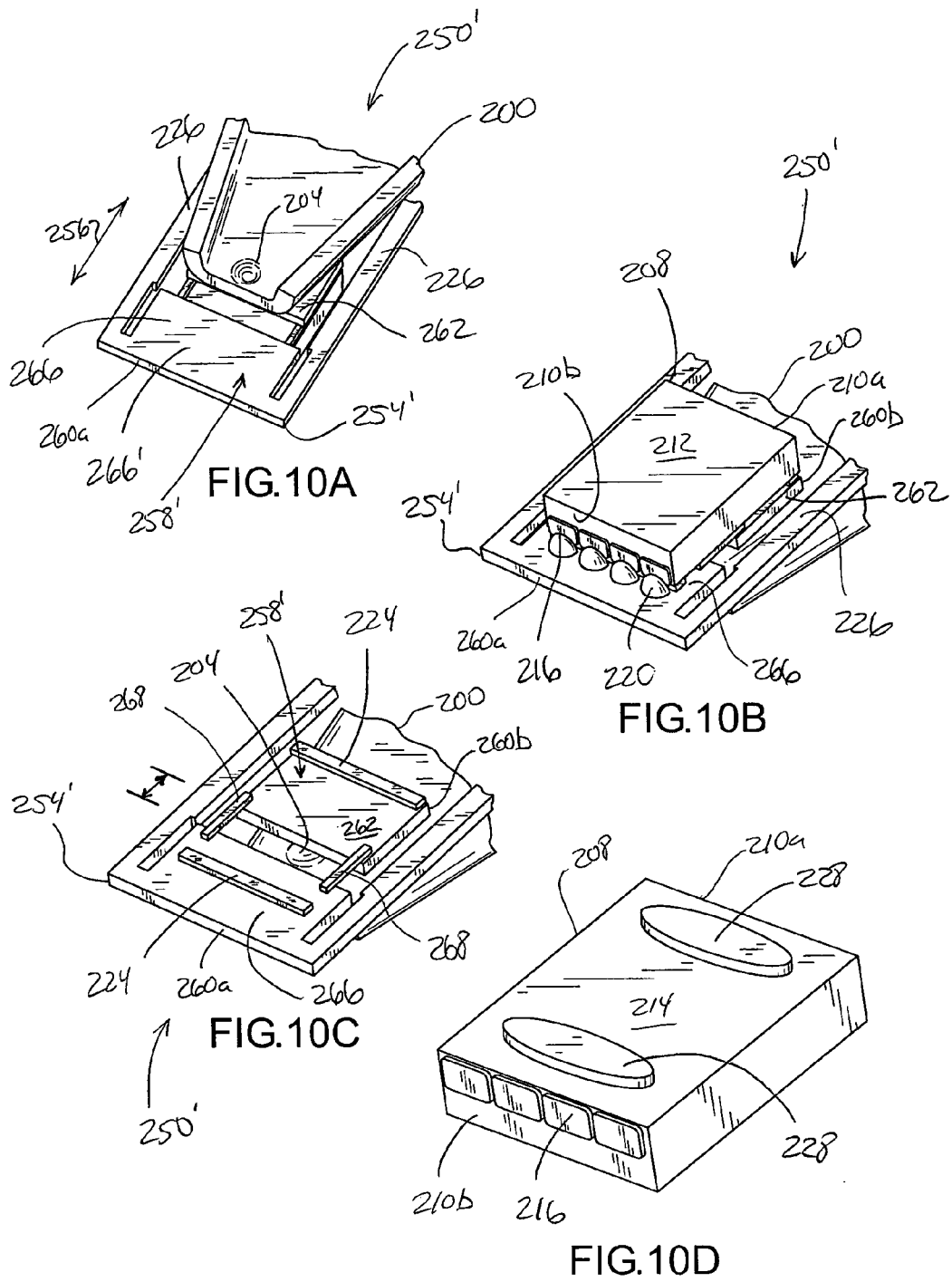

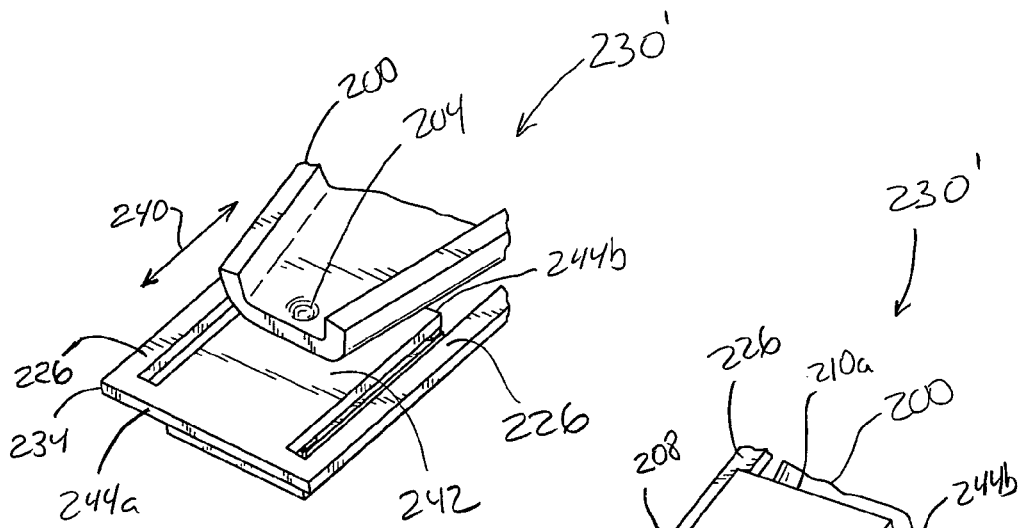
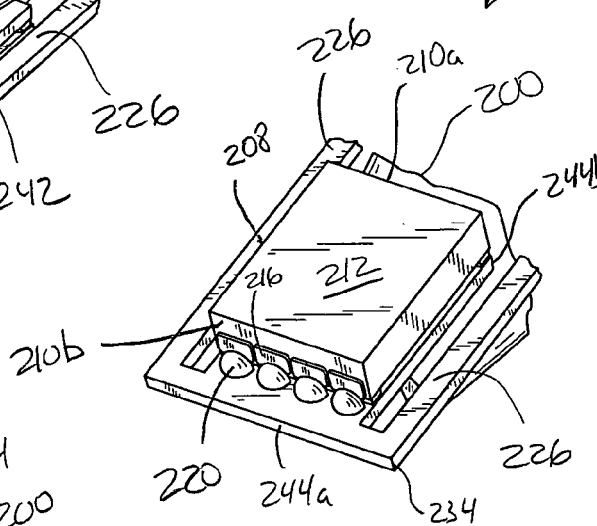
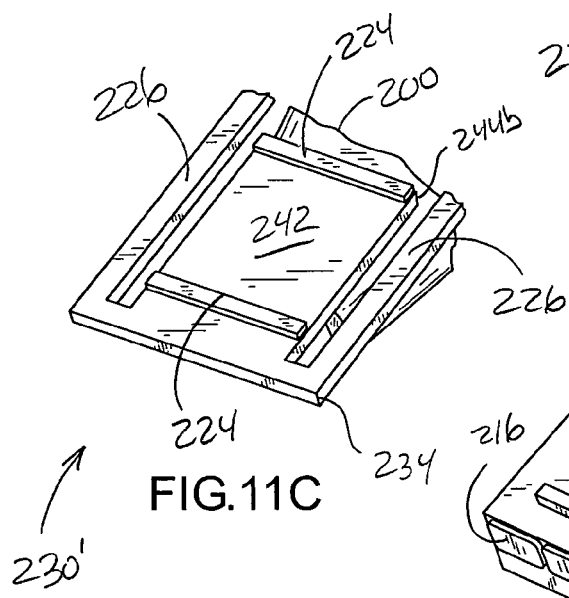
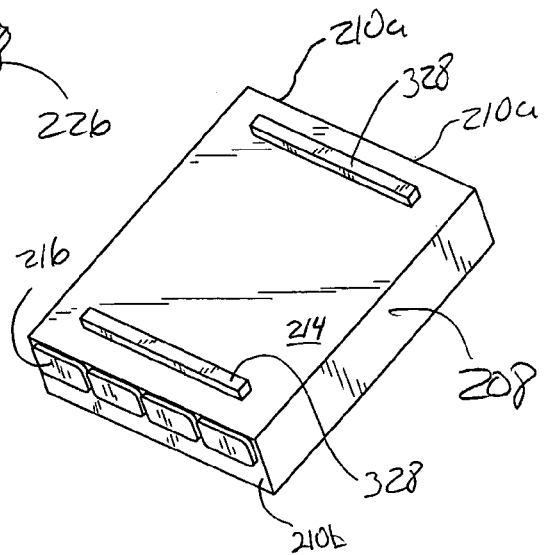
FIG.11A
FIG.11B
FIG.11C
FIG.11D

THERMALLY-COMPENSATING ATTACHMENT OF DISK DRIVE SLIDER TO FLEXURE

CROSS-REFERENCE TO RELATED APPLICATIONS

This patent application claims priority under 35 U.S.C. §119(e) to U.S. Provisional Patent Application Ser. No. 60/599,200, that was filed on Aug. 5, 2004, that is entitled "SUSPENSION CONCEPTS FOR THERMAL CLEARANCE MITIGATION," and the entire disclosure of which is hereby incorporated by reference in its entirety herein.

FIELD OF THE INVENTION

The present invention is generally directed to disk drive head-gimbal assemblies and, more particularly, to the attachment of a slider to a disk drive flexure in a manner that addresses the effect of the operating temperature within the disk drive on fly height.

BACKGROUND OF THE INVENTION

The operating temperature within the disk drive may have an effect on fly height or the spacing between the read/write head and the corresponding data storage disk. The operating temperature within the disk drive may deform the slider that carries the read/write head via a deformation of the flexure on which the slider is mounted. This deformation is caused by a difference between the coefficients of thermal expansion of the slider and flexure. "Crown" is a curvature along the length dimension of the slider (coinciding with the spacing between the leading and trailing edges of the slider). Positive crown or an end-to-end convexity of the slider air bearing surface generally increases the fly height. "Cross-crown" or "camber" is a curvature along the width dimension of the slider. Positive camber or a side-to-side convexity of the slider air bearing surface generally decreases the fly height. Crown has a tendency to dominate camber in head-gimbal assemblies.

Crown tends to operate disadvantageously with disk drive operating temperature for two reasons. At reduced operating temperatures, a positive crown is induced, which tends to pull the read/write head away from its corresponding data storage disk. Moreover, at these reduced operating temperatures, the read/write head itself may also tend to pull away from its corresponding data storage disk due to normal expansion/contraction effects that are intrinsic to the maternal that defines the read/write head.

BRIEF SUMMARY OF THE INVENTION

A first aspect of the present invention is generally directed to a disk drive head-gimbal assembly that includes a flexure and a slider. The flexure includes a flexure tongue that is in the form of a cantilever. This flexure tongue includes a first flexure tongue section, a second flexure tongue section, and a slider decoupling section that is located or disposed between the first and second flexure tongue sections proceeding along the length dimension of the flexure tongue. The second flexure tongue section includes the free end of the cantilevered flexure tongue, and the first flexure tongue section includes the fixed end of the cantilevered flexure tongue. The slider is fixed to each of the first and second flexure tongue sections, and includes a trailing edge that is at least partially aligned with the first flexure tongue section (e.g., the slider could be wider at its trailing edge than a corresponding portion of the first flexure tongue section), as well as a leading edge that is at least partially aligned with the second flexure tongue section (e.g., the slider could be wider at its leading edge than a corresponding portion of the second flexure tongue section). An area of a projection of the slider onto the slider decoupling section is less than an area of a projection of the slider onto the first flexure tongue section, and is also less than an area of a projection of the slider onto the second flexure tongue section.

Various refinements exist of the features noted in relation to the first aspect of the present invention. Further features may also be incorporated in the first aspect of the present invention as well. These refinements and additional features may exist individually or in any combination. The head-gimbal assembly may include a load beam or suspension of any appropriate size, shape, and or/configuration. Portions of the flexure other than the flexure tongue also may be of any appropriate size, shape, and/or configuration, and further the flexure may be mounted to the suspension in any appropriate manner. For instance, the flexure may include a pair of gimbal legs that extend from a portion of the flexure that interfaces with the suspension, that are free to deflect relative to the suspension, and that desirably support the flexure tongue.

The slider may be fixed to each of the first and second flexure tongue sections in any appropriate manner in accordance with the first aspect. Adhesive, ball bonding, or a combination thereof may be used to mount the slider onto each of the first and second flexure tongue sections. In one embodiment, the slider decoupling section of the flexure tongue is not fixed in any manner to the slider.

The flexure tongue associated with the first aspect may include a first connector that extends between and structurally interconnects the first and second flexure tongue sections. That portion of the first connector that is located between the first and second flexure tongue sections may then be characterized as being part of the slider decoupling section of the flexure tongue. In one embodiment, the first connector is separately fixed to each of the first and second flexure tongue sections. For instance, the first connector may be formed from a different material than the first and second flexure tongue sections (e.g., polyimide for the first connector, and stainless steel for the first and second flexure tongue sections). The first connector could be in the form of a thin beam or could be in the form of a sheet that occupies a substantial portion of the gap between the first and second flexure tongue sections in this instance. In another embodiment, the first connector is integrally formed with the first and second flexure tongue sections (e.g., stainless steel). "Integral" means that there would be no joint between the first connector and either of the first or second flexure tongue sections in this particular case. In one embodiment, the first connector is less rigid than each of the first and second flexure tongue sections along the length dimension of the flexure tongue (e.g., within a plane that is normal to its corresponding data storage disk when the head-gimbal assembly is incorporated into a disk drive). In yet another embodiment, the first connector is thinner than each of the first and second flexure tongue sections.

The first connector may be a thin beam that extends along a central reference axis that extends along the length dimension of the flexure tongue, such that the flexure tongue may be characterized as being in the form of an I-beam or the like in the case of the first aspect (e.g., the flexure tongue may include a cut-out section along each side of the first connector). The first connector may define the entirety of the slider decoupling section in this instance. The first connector may also be a thin beam that is disposed more toward one of the two sides of the flexure tongue. In this case, the flexure tongue would typically include a second connector in the form of a thin beam that also extends between and structurally interconnects the first and second flexure tongue sections (e.g., the first and second connectors may be incorporated so as to be the mirror image of each other). The first and second connectors may define the entirety of the slider decoupling section. The first and second connectors could each be separately fixed to each of the first and second flexure tongue sections (e.g., using polyimide for the first connector, and using stainless steel for the first and second flexure tongue sections). Another option would be for the first and second connectors and the first and second flexure tongue sections to be an integral structure (e.g., no joint between the first connector and either of the first or second flexure tongue sections, and no joint between the second connector and either of the first or second flexure tongue sections). In one embodiment where the first and second connectors and the first and second flexure tongue sections are an integral structure and formed from a common material (e.g. stainless steel), the first and second connectors, along with the first and second flexure tongue sections, collectively define an aperture or opening that extends completely through the flexure tongue.

The first and second flexure tongue sections associated with the first aspect and as defined each may be of any appropriate size, shape, and/or configuration. However, one or more desirable features may be utilized by the first and/or second flexure tongue sections. In one embodiment, the second flexure tongue section is at least generally the same size as a dimple or protrusion that is incorporated into the structure of a suspension and that contacts the second flexure tongue section (e.g., the perimeters of the dimple and second flexure tongue section may be at least generally aligned). In another embodiment, the first flexure tongue section (that includes the fixed end of the cantilevered flexure tongue) is wider than the second flexure tongue section (that includes the free end of the cantilevered flexure tongue). The first flexure tongue section again is associated with the trailing edge of the slider, and increasing its width provides an increased positive camber for the slider at its trailing edge, which may reduce fly height. The trailing edge of the slider may in fact coincide with or be aligned with the widest portion of the flexure tongue.

The slider decoupling section used by the flexure tongue in the case of the first aspect is of a configuration that may be characterized as reducing a positive crown of the slider, which may reduce fly height. One way to further characterize this configuration is in relation to what may be characterized as a flexure tongue maximum footprint that is in the form of a reference rectangle having a width that is equal to the maximum width of the flexure tongue and a length that is equal to the maximum length of the flexure tongue. The area of the surface of the flexure tongue that faces the slider is no more than about 50% of the area of its flexure tongue maximum footprint in one embodiment.

A second aspect of the present invention is generally directed to a disk drive head-gimbal assembly that includes a flexure and a slider. The flexure includes a flexure tongue that is in the form of a cantilever. This flexure tongue in turn includes a first flexure tongue section, a second flexure tongue section, and a slider decoupling section that is located or disposed between the first and second flexure tongue sections proceeding along the length dimension of the flexure tongue. A first connector extends between and structurally interconnects the first and second flexure tongue sections, and thereby defines at least part of the slider decoupling section. The slider is fixed to each of the first and second flexure tongue sections, and includes a trailing edge that is at least partially aligned with the first flexure tongue section (e.g., the slider could be wider at its trailing edge than a corresponding portion of the first flexure tongue section), as well as a leading edge that is at least partially aligned with the second flexure tongue section (e.g., the slider could be wider at its leading edge than a corresponding portion of the second flexure tongue section). The slider decoupling section is less rigid than each of the first and second flexure tongue sections along the length dimension of the flexure tongue.

Various refinements exist of the features noted in relation to the second aspect of the present invention. Further features may also be incorporated in the second aspect of the present invention as well. These refinements and additional features may exist individually or in any combination. The head-gimbal assembly may include a load beam or suspension of any appropriate size, shape, and or/configuration. Portions of the flexure other than the flexure tongue also may be of any appropriate size, shape, and/or configuration, and further the flexure may be mounted to the suspension in any appropriate manner. For instance, the flexure may include a pair of gimbal legs that extend from a portion of the flexure that interfaces with the suspension, that are free to deflect relative to the suspension, and that desirably support the flexure tongue.

The slider may be fixed to each of the first and second flexure tongue sections in any appropriate manner in accordance with the second aspect. Adhesive, ball bonding, or a combination thereof may be used to mount the slider onto each of the first and second flexure tongue sections. In one embodiment, the slider decoupling section of the flexure tongue is not fixed in any manner to the slider.

That portion of the first connector that is located between the first and second flexure tongue sections in the case of the second aspect again is characterized as being part of a slider decoupling section of the flexure tongue in accordance with second aspect. In one embodiment, the first connector is separately fixed to each of the first and second flexure tongue sections. For instance, the first connector may be formed from a different material than the first and second flexure tongue sections (e.g., polyimide for the first connector, and stainless steel for the first and second flexure tongue sections). The first connector could be in the form of a thin beam or could be in the form of a sheet that occupies a substantial portion of the gap between the first and second flexure tongue sections in this instance. In another embodiment, the first connector is integrally formed with the first and second flexure tongue sections (e.g., stainless steel). "Integral" means that there would be no joint between the first connector and either of the first or second flexure tongue sections in this particular case. In one embodiment, the first connector is less rigid than each of the first and second flexure tongue sections along the length dimension of the flexure tongue (e.g., within a plane that is normal to its corresponding data storage disk when the head-gimbal assembly is incorporated into a disk drive). In yet another embodiment, the first connector is thinner than each of the first and second flexure tongue sections.

The first connector may be a thin beam that extends along a central reference axis that extends along the length dimension of the flexure tongue, such that the flexure tongue may be characterized as being in the form of an I-beam or the like in the case of the second aspect (e.g., the flexure tongue may include a cut-out section along each side of the first connector). The first connector may define the entire structural interconnection between the first and second flexure tongue sections in this instance. The first connector may also be a thin beam that is disposed more toward one of the two sides of the flexure tongue. In this case, the flexure tongue would typically include a second connector in the form of a thin beam that also extends between and structurally interconnects the first and second flexure tongue sections (e.g., the first and second connectors may be incorporated so as to be the mirror image of each other). The first and second connectors may define the entire structural interconnection between the first and second flexure tongue sections in this instance. The first and second connectors could each be separately fixed to each of the first and second flexure tongue sections (e.g., using polyimide for the first connector, and using stainless steel for the first and second flexure tongue sections). Another option would be for the first and second connectors and the first and second flexure tongue sections to be an integral structure (e.g., no joint between the first connector and either of the first or second flexure tongue sections, and no joint between the second connector and either of the first or second flexure tongue sections). In one embodiment where the first and second connectors and the first and second flexure tongue sections are an integral structure and formed from a common material (e.g. stainless steel), the first and second connectors, along with the first and second flexure tongue sections, collectively define an aperture or opening that extends completely through the flexure tongue.

The first and second flexure tongue sections associated with the second aspect and as defined each may be of any appropriate size, shape, and/or configuration. However, one or more desirable features may be utilized by the first and/or second flexure tongue sections. In one embodiment, the second flexure tongue section is at least generally the same size as a dimple or protrusion that is incorporated into the structure of a suspension and that contacts the second flexure tongue section (e.g., the perimeters of the dimple and second flexure tongue section may be at least generally aligned). In another embodiment, the first flexure tongue section includes a fixed end of the cantilevered flexure tongue, and is wider than the second flexure tongue section having a free end of the cantilevered flexure tongue. The first flexure tongue section may be associated with the trailing edge of the slider, and increasing its width provides an increased positive camber for the slider at its trailing edge, which may reduce fly height. The trailing edge of the slider may in fact coincide with or be aligned with the widest portion of the flexure tongue.

The configuration of the flexure tongue in the case of the second aspect may be characterized as reducing a positive crown of the slider, which may reduce fly height. One way to further characterize this configuration is in relation to what may be characterized as a flexure tongue maximum footprint that is in the form of a reference rectangle having a width that is equal to the maximum width of the flexure tongue and a length that is equal to the maximum length of the flexure tongue. The area of the surface of the flexure tongue that faces the slider is no more than about 50% of the area of its flexure tongue maximum footprint in one embodiment.

A third aspect of the present invention is generally directed to a disk drive head-gimbal assembly that includes a slider and a flexure. The flexure includes a flexure tongue that is in the form of a cantilever, and that includes a first aperture that extends completely through the flexure tongue. The slider is fixed to the flexure tongue so as to be aligned with at least part of the first aperture. At least part of that surface of the slider that faces the flexure tongue is exposed by being aligned with the first aperture through the flexure tongue. That is, neither adhesive nor the flexure tongue is disposed over/on this part of the slider. The various features discussed above in relation to the first through the third aspects may be used by this third aspect, individually and in any combination.

A fourth aspect of the present invention is generally directed to a disk drive head-gimbal assembly that includes a slider and a flexure. The flexure includes a flexure tongue that is in the form of a cantilever. The slider is mounted on the flexure tongue (e.g., via adhesive). The flexure tongue is configured to reduce the surface area of the flexure tongue that projects toward and interfaces with the slider. This configuration may be characterized in relation to what may be characterized as a flexure tongue maximum footprint that is in the form of a reference rectangle having a width that is equal to the maximum width of the flexure tongue and a length that is equal to the maximum length of the flexure tongue. The area of the surface of the flexure tongue that faces the slider is no more than about 50% of the area of the flexure tongue maximum footprint.

Various refinements exist of the features noted in relation to the fourth aspect of the present invention. Further features may also be incorporated in the fourth aspect of the present invention as well. These refinements and additional features may exist individually or in any combination. For instance, the various features discussed above in relation to the first through the third aspects may be used by this fourth aspect, individually and in any combination. Moreover, the slider may be of any appropriate size, shape, and configuration in relation to the flexure tongue. In one embodiment, the perimeter of the slider is contained within the perimeter of the flexure tongue. In another embodiment, the slider is wider than at least part of the flexure tongue, the leading edge of the slider extends beyond the flexure tongue, the trailing edge of the slider extends beyond the flexure tongue, individually or any combination thereof.

A fifth aspect of the present invention is generally directed to a disk drive head-gimbal assembly that includes a suspension and a slider that are interconnected by a flexure. The flexure includes a flexure tongue that is in the form of a cantilever. This flexure tongue includes first and second flexure tongue sections that are spaced from each other along the length dimension of the flexure tongue and that are structurally interconnected. The second flexure tongue section includes the free end of the cantilevered flexure tongue, and the first flexure tongue section includes the fixed end of the cantilevered flexure tongue. The slider is mounted on the flexure tongue (e.g., via adhesive). The suspension includes a projection that engages the second flexure tongue section. This projection and the second flexure tongue section are at least generally the same size and are vertically aligned (e.g., the perimeters of the projection and the second flexure tongue section are at least generally vertically aligned). The various features discussed above in relation to the first through the third aspects may be used by this fifth aspect, individually and in any combination.

A sixth aspect of the present invention is generally directed to a disk drive head-gimbal assembly that includes a flexure and a slider. This flexure tongue includes first and second flexure tongue sections that are spaced from each other along the length dimension of the flexure tongue and that are structurally interconnected. The second flexure tongue section includes the free end of the cantilevered flexure tongue, while the first flexure tongue section includes the fixed end of the cantilevered flexure tongue. A trailing edge section of the slider is mounted on the first flexure tongue section, and a leading edge section of the slider is mounted on the second flexure tongue section. The first flexure tongue section is wider than the second flexure tongue section, and at least part of the trailing edge of the slider is aligned with the first flexure tongue section. The various features discussed above in relation to the first through the third aspects may be used by this sixth aspect, individually and in any combination.

A seventh aspect of the present invention is generally directed to a disk drive head-gimbal assembly that includes a flexure and a slider that are interconnected by a flexure. The flexure includes a flexure tongue that is in the form of a cantilever. The slider is mounted on the flexure by at least one discrete line of adhesive. In one embodiment, only two of such lines of adhesive fix the slider to the flexure tongue (e.g., one at or close to the leading edge of the slider, and one at or close to the trailing edge of the slider). In any case, each such adhesive line may extend at least generally perpendicularly to the length dimension of the flexure tongue, may extend across a substantial portion of the width of the slider, or both.

BRIEF DESCRIPTION OF THE SEVERAL VIEWS OF THE DRAWING

FIG. 5D is an enlarged view of a portion of the head-gimbal assembly of FIG. 5A.

FIG. 6A is a perspective schematic of one side of a prior art head-gimbal assembly.

FIG. 6B is a perspective schematic of an opposite side of the head-gimbal assembly from that shown in FIG. 6A.

FIG. 6C is a perspective schematic of the same side of the head-gimbal assembly shown in FIG. 6B, but without the slider.

FIG. 6D is a perspective schematic of the side of the slider that faces the side of the flexure tongue shown in FIG. 6C.

FIG. 7A is a perspective schematic of one side of a head-gimbal assembly having a first embodiment of a thermally-compensating flexure.

FIG. 7B is a perspective schematic of an opposite side of the head-gimbal assembly from that shown in FIG. 7A.

FIG. 7C is a perspective schematic of the same side of the head-gimbal assembly shown in FIG. 7B, but without the slider.

FIG. 7D is a perspective schematic of the side of the slider that faces the side of the flexure tongue shown in FIG. 7C.

FIG. 8A is a perspective schematic of one side of a head-gimbal assembly having a second embodiment of a thermally-compensating flexure.

FIG. 8B is a perspective schematic of an opposite side of the head-gimbal assembly from that shown in FIG. 8A.

FIG. 8C is a perspective schematic of the same side of the head-gimbal assembly shown in FIG. 8B, but without the slider.

FIG. 8D is a perspective schematic of the side of the slider that faces the side of the flexure tongue shown in FIG. 8C.

FIG. 9A is a perspective schematic of one side of a head-gimbal assembly having a third embodiment of a thermally-compensating flexure.

FIG. 9B is a perspective schematic of an opposite side of the head-gimbal assembly from that shown in FIG. 9A.

FIG. 9C is a perspective schematic of the same side of the head-gimbal assembly shown in FIG. 9B, but without the slider.

FIG. 9D is a perspective schematic of the side of the slider that faces the side of the flexure tongue shown in FIG. 9C.

FIG. 10A is a perspective schematic of one side of a head-gimbal assembly having a fourth embodiment of a thermally-compensating flexure.

FIG. 10B is a perspective schematic of an opposite side of the head-gimbal assembly from that shown in FIG. 10A.

FIG. 10C is a perspective schematic of the same side of the head-gimbal assembly shown in FIG. 10B, but without the slider.

FIG. 10D is a perspective schematic of the side of the slider that faces the side of the flexure tongue shown in FIG. 10C.

FIG. 11A is a perspective schematic of one side of a head-gimbal assembly having an adhesive-based thermally-compensating attachment of a slider to a flexure.

FIG. 11B is a perspective schematic of an opposite side of the head-gimbal assembly from that shown in FIG. 11A.

FIG. 11C is a perspective schematic of the same side of the head-gimbal assembly shown in FIG. 11B, but without the slider.

FIG. 11D is a perspective schematic of the side of the slider that faces the side of the flexure tongue shown in FIG. 11C.

DETAILED DESCRIPTION OF THE INVENTION

Figure 1:
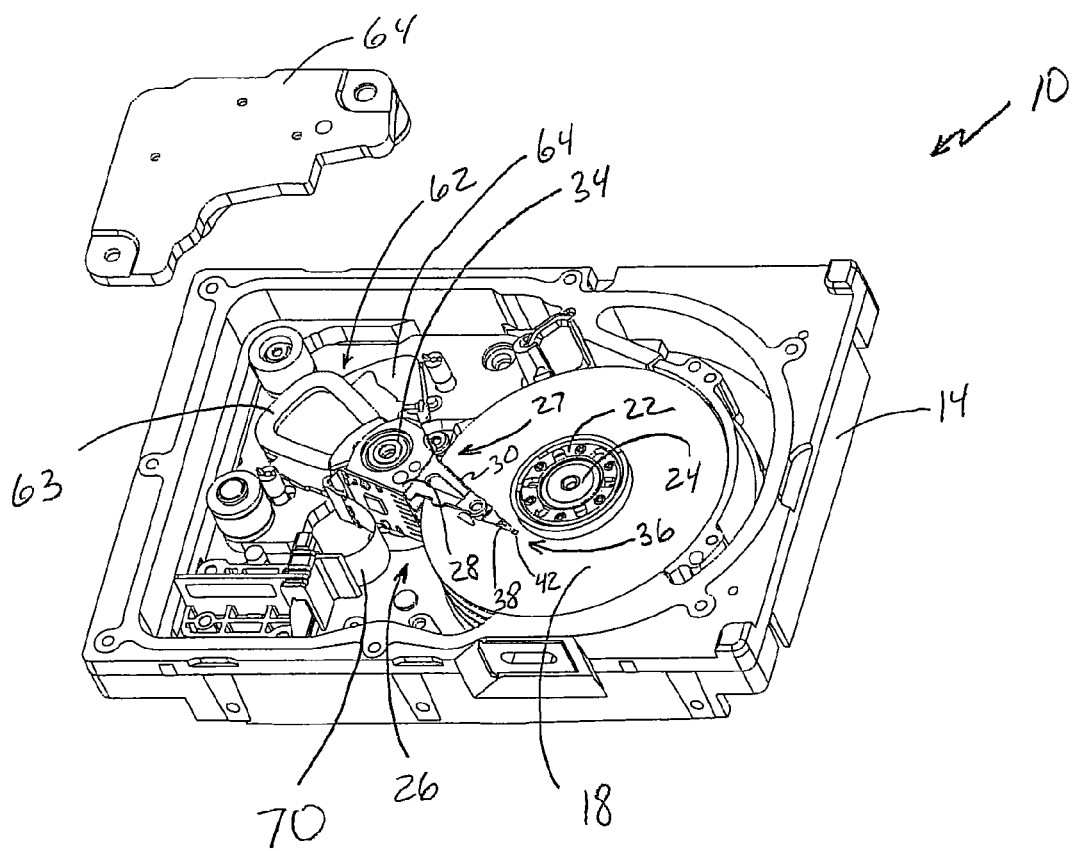
FIG. 1 is a perspective view of a prior art disk drive that may be adapted to incorporate a thermally-compensating attachment of a slider to a flexure tongue.
Figure 2:
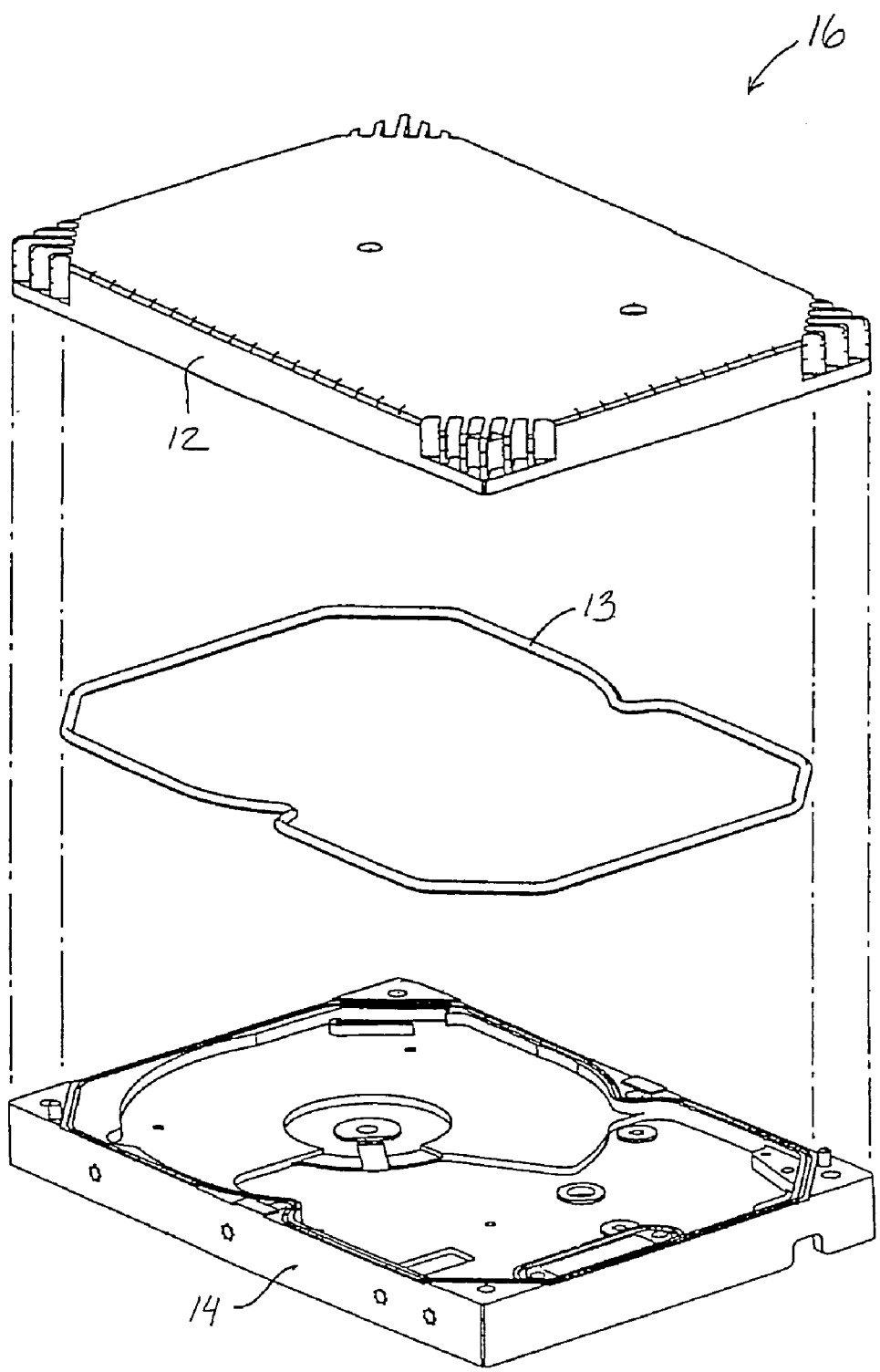
FIG. 2 is an exploded, perspective view of a prior art disk drive housing for the disk drive of FIG. 1.

One embodiment of a prior art disk drive 10 is illustrated in FIGS. 1-4. However, this disk drive 10 may be adapted to incorporate a thermally-compensating attachment of the slider to the flexure, the combination of which is not in the prior art. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub by a disk clamp 22, and the hub is rotatably interconnected with the disk drive base plate 14 and/or cover 12. A spindle motor rotates the hub and attached clamp 22 about a shaft 24 of the spindle motor to simultaneously spin the data storage disk(s) 18 at an appropriate rate.

The disk drive 10 also includes a head positioner assembly 26, that in turn includes an actuator 27. The actuator 27 is in the form of an actuator body 28 having one or more individual rigid actuator arms 30 extending therefrom. This actuator body 28 is mounted on a pivot bearing 34. Each actuator arm 30 pivots about the pivot bearing 34, which in turn is rotatably supported by the base plate 14 and/or cover 12. Multiple actuator arms 30 are disposed in vertically spaced relation, with one actuator arm 30 typically being provided for each major data storage surface of each data storage disk 18 of the disk drive 10. Other actuator configurations could be utilized as well, such as an "E" block having one or more rigid actuator arm tips or the like that cantilever from a common structure, or one or more rigid actuator arms that are each mounted on the pivot bearing 34.

Movement of the head positioner assembly 26 is provided by an appropriate head stack assembly drive, such as a voice coil motor 62 or the like. The voice coil motor 62 may be characterized as a rotary drive. The voice coil motor 62 is a magnetic assembly that controls the movement of the head positioner assembly 26 under the direction of control electronics 66. Typical components of the voice coil motor 62 are a coil 63 that may be mounted on the head positioner assembly 26, and a separate voice coil motor magnet assembly, ("VCM Assembly") 64 that is disposed above and below this coil 63 (the upper VCM assembly 64 being "exploded away" in FIG. 1). The VCM magnet assemblies 64 will typically be mounted on the housing 16 in a fixed position, with the upper VCM assembly 64 being appropriately supported above the lower VCM assembly. Any appropriate head positioner assembly drive type may be utilized by the disk drive 10, including a linear drive (for the case where the head positioner assembly 26 is interconnected with the base plate 14 and/or cover 12 for linear movement versus the illustrated pivoting movement about the pivot bearing 34), as well as other types of rotational/pivoting drives.

A head-gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are part of the head positioner assembly 26. Typically the suspension 38 of each HGA 36 is biased at least generally toward its corresponding disk 18 by a spring-like force. A slider 42 is disposed at or near the free end of each suspension 38. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head 44 is interconnected with the control electronics 66 of the disk drive 10 by a flex cable 70 that is typically mounted on the head positioner assembly 26. Signals are exchanged between the head 44 on the slider 42 and its corresponding data storage disk 18 for disk drive read and/or write operations. In this regard, the voice coil motor 62 pivots the actuator arm(s) 30 to simultaneously move each head 44 on its slider 42 "across" the corresponding data storage disk 18 to position the head 44 at the desired/required radial position on the disk 18 (i.e., at the correct track on the data storage disk 18) for disk drive read/write operations.

When the disk drive 10 is not in operation, the head positioner assembly 26 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 may include a ramp assembly that is disposed beyond a perimeter of the data storage disk 18 to typically both move the corresponding slider 42 vertically away from its corresponding data storage disk 18 and to also exert somewhat of a retaining force on the corresponding actuator arm 30. Any configuration for the ramp assembly that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 may include an actuator arm assembly latch that moves from a non-latching position to a latching position to engage an actuator arm 30 so as to preclude the same from pivoting in a direction which would tend to drag the slider(s) 42 across its corresponding data storage disk 18.

Figure 3:
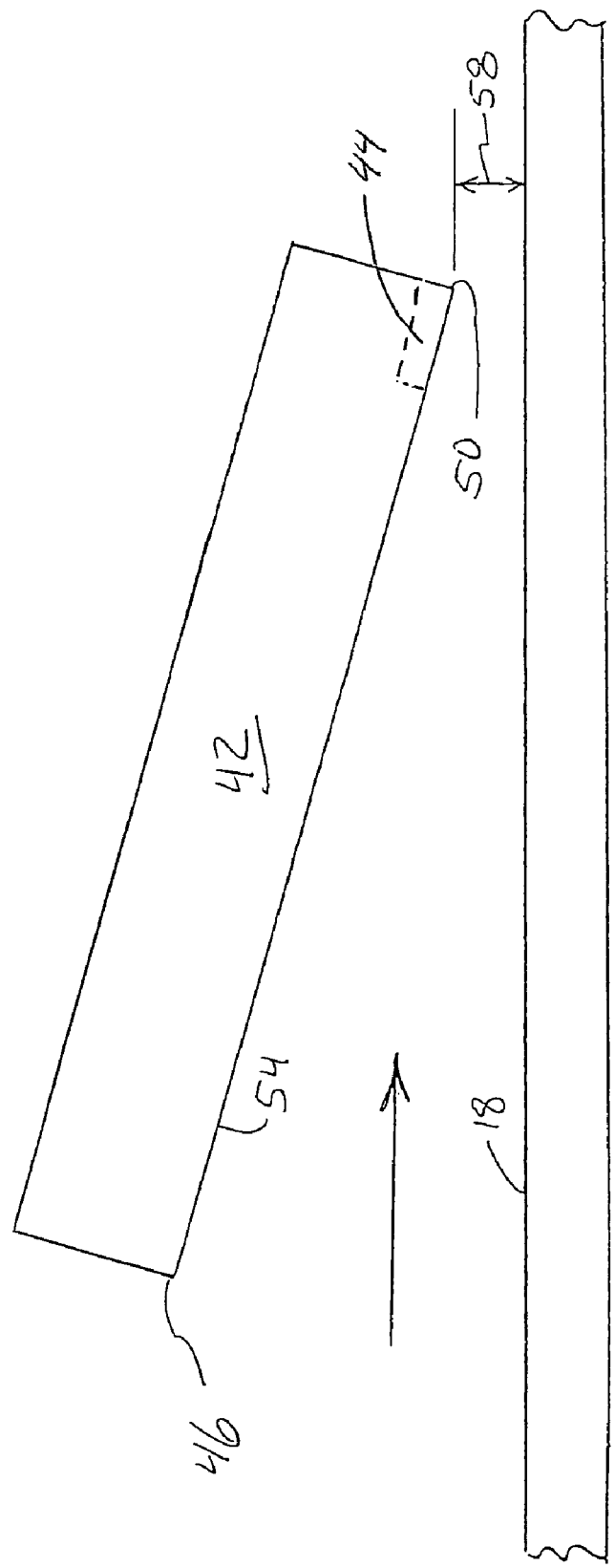
FIG. 3 is a schematic representation of a prior art flying-type slider that may be used by the disk drive of FIG. 1.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 3, the slider 42 is disposed at a pitch angle such that its leading edge 46 of the slider 42 is disposed further from its corresponding data storage disk 18 than its trailing edge 50. The transducer(s) 44 would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 4:
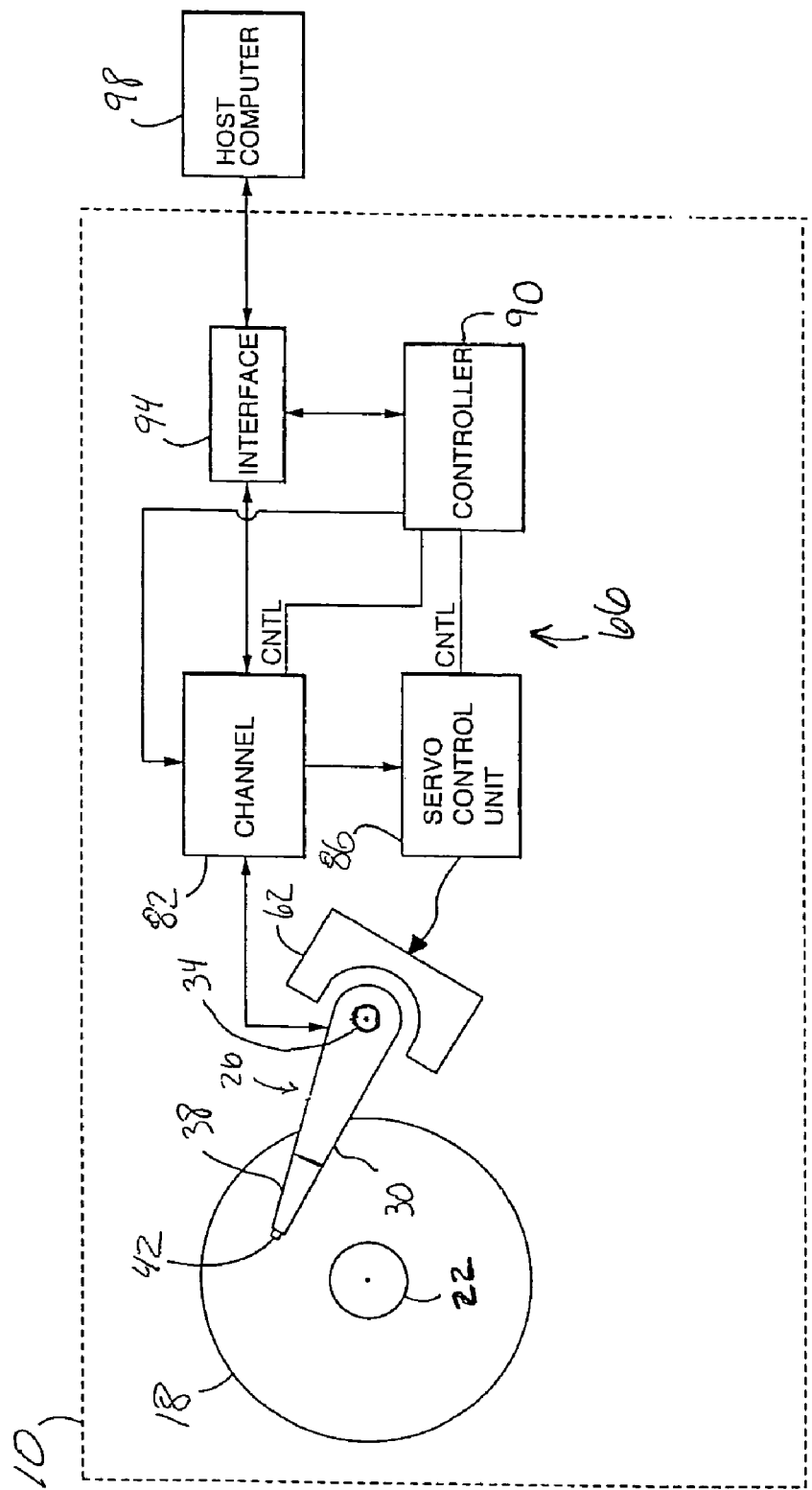
FIG. 4 is a simplified prior art electrical component block diagram of the disk drive of FIG. 1.

FIG. 4 illustrates a simplified electrical component block diagram of the disk drive 10 of FIG. 1. The control electronics 66 in this case includes a controller 90 and a servo control unit 86. The disk drive 10 in FIG. 4 also includes a channel 82, as well as an interface 94 for interconnecting the disk drive 10 with a host computer 98. During operation of the disk drive 10, the data storage disk 18 rotates. Data is stored on the data storage disk 18 in substantially concentric tracks. Data may be read from or written to the data storage disk 18 by moving the slider 42 and its head 44 to the desired track and performing the desired communication operation (i.e., a read or write operation). In one embodiment, the data storage disk 18 includes a magnetic media having concentric read/write tracks and the head 44 includes at least one transducer that is capable of communicating with this magnetic data storage disk 18.

The voice coil motor 62 receives servo control information from the servo control unit 86 to cause the voice coil motor 62 to move each actuator arm 30 and its corresponding head 44 when repositioning of the head(s) 44 is desired/required. In this regard, the head(s) 44 may periodically read positioning information from the surface of the corresponding data storage disk 18 and transmit the positioning information to the servo control unit 86 via the channel 82. The servo control unit 86 compares the present position of the head(s) 44 to a desired position, with movement of the actuator arm(s) 30 being made as required for proper track alignment.

The channel 82 receives a number of inputs for processing so that data may be manipulated by the devices internal and external, such as the host computer 98, which is again interconnected with the disk drive 10 via the interface 94. One operation of the channel 82 is to receive an analog signal from the head(s) 44 and to convert the analog signal to a digital signal recognized by the host computer 98. In addition, the channel 82 facilitates the storage of information from the host computer 98 to the data storage disk(s) 18 by encoding data signals from the host computer 98 and creating a write signal, from the encoding data, which is transmitted to the head(s) 44 for storage on the corresponding data storage disk 18.

The controller 90 controls the timing and operation of other elements of the disk drive 10. The controller 90 receives input/output requests from the host computer 98 via the interface 94. Based on the input to the controller 90, the controller 90 delivers appropriate commands to the servo control unit 86 and the channel 82. For example, in a read operation, the controller 90 commands the servo control unit 86 to move the head(s) 44 to the desired track on the corresponding data storage disk 18 such that the data written on the disk 18 may be transferred to the host computer 98. Accordingly, the servo control unit 86 moves the head(s) 44 to the desired track on the corresponding data storage disk 18 using the servo positioning information read from the data storage disk 18 by the corresponding head 44. In turn, the head(s) 44 reads the information from the corresponding data storage disk 18 and transmits information to the channel 82 that converts the information so that it may be interpreted by the host computer 98.

One embodiment of a head-gimbal assembly that may be used in place of the head-gimbal assembly 36 in the disk drive 10 is illustrated in FIGS. 5A-D and is identified by reference numeral 100. The head-gimbal assembly 100 generally includes suspension 108, an electrical trace assembly or a flex cable 101, a flexure 115, and what may be characterized as a slider assembly 136. The suspension 108, flex cable 101, and flexure 115 may be of any appropriate size, shape, and/or configuration. Generally, the suspension 108 biases the slider assembly 136 toward its corresponding data storage disk; the flexure 115 provides a desired interconnection between the slider assembly 136 and the suspension 108; the flex cable 101 provides electrical signals to and receives electrical signals from the slider assembly 136; and the slider assembly 136 communicates with its corresponding data storage disk.

The flexure 115 is appropriately mounted on the suspension 108 at one or more locations, and includes a pair of deflectable gimbal legs 132 to movably support the slider assembly 136 relative to the suspension 108. In this regard, the flexure 115 further includes a flexure tongue 128 that is supported by the gimbal legs 132. A hinge (not shown) also allows the flexure tongue 128 to pivot/move along at least somewhat of a predefined axis relative to the gimbal legs 132. Typically, the hinge axis will be at least generally perpendicular to the long axis of the suspension 108. A dimple or other protrusion (not shown) is included on the suspension 108 and engages the side of the flexure tongue 128 that is opposite the side on which the slider assembly 136 is mounted.

The suspension 108 includes both a leading edge limiter 113 and a trailing edge limiter 114 to establish a maximum displacement of the leading and trailing edges, respectively, of the flexure tongue 128 relative to the suspension 108. The suspension 108 also includes a lift tab 112 for use in parking the head-gimbal assembly 100. Engagement of this lift tab 112 with an appropriate load/unload ramp exerts a force on the suspension 108 to increase the vertical spacing between the slider assembly 136 and its corresponding data storage disk. The leading edge limiter 113 and/or trailing edge limiter 114 of the suspension 108 may engage the flexure 115 at this time, as a suction force may still be "pulling" the slider 140 toward its corresponding data storage disk during the parking operation.

The slider assembly 136 is mounted on the flexure tongue 128 such that the trailing edge of the slider assembly 136 is disposed at or close to the hinge of the flexure tongue 128. An enlarged view of the slider assembly 136 is presented in FIG. 5B. There are two main components of the slider assembly 136—a slider 140 and what may be characterized as a slider position control microactuator or slider positioner 156. The slider 140 may be of any appropriate size, shape, and/or configuration. Generally, the slider 140 includes an air bearing surface 142 (the surface of the slider 140 that projects toward its corresponding data storage disk during disk drive operations, and that is contoured to exert forces on the slider 140 to allow it to "fly" above its corresponding data storage disk during disk drive operations, typically in closely spaced relation), a leading edge 144, a trailing edge 148, and a read/write head 152. The fluid (e.g., air) flows relative to the slider 140 from its leading edge 144 to its trailing edge 148 during disk drive operations. The illustrated slider 140 is of the "flying type," and its leading edge 144 will be spaced further from its corresponding data storage disk than its trailing edge 148 during disk drive operations. The leading edge 144 of the slider 140 is allowed to move further away from its corresponding data storage disk than the trailing edge 148 of the slider 140 by a pivoting of the flexure tongue 128 at least generally about an axis.

The slider positioner 156 is used to position the slider 140 (more specifically its read/write head 152) relative to a certain track of the corresponding data storage disk. The slider positioner 156 is generally in the form of a frame 160 and a pair of actuators 172. The frame 160 is appropriately mounted on the flexure tongue 128, and includes a base 164, as well as a pair of arms 168 that are spaced along the base 164, that each cantilever from the base 164, and that are able to move relative to the flexure tongue 128. A pair of slots 166 is formed in the base 164 at the corner between each arm 168 and the base 164. These slots 166 extend completely through the frame 160, and are of a uniform width along their entire length. A first material 170 (e.g., an epoxy or adhesive) is disposed within each of the slots 166 in order to reduce the potential for cracking of the frame 160 at the junction between the arms 168 and the base 164, and also to structurally reinforce the frame 160.

The slider 140 is positioned within the space collectively defined by the pair of arms 168 and the distal end 165 of the base 164. Typically, there will be a space between the slider 140 and each of the arms 168, as well as a space between the leading edge 144 of the slider 140 and the distal end 165 of the base 164. A first material 182 (e.g., an epoxy or adhesive) is used to fix a portion of the slider 140 to each of the arms 168. This first material 182 is typically disposed toward the free ends of the arms 168.

Figure 5A:
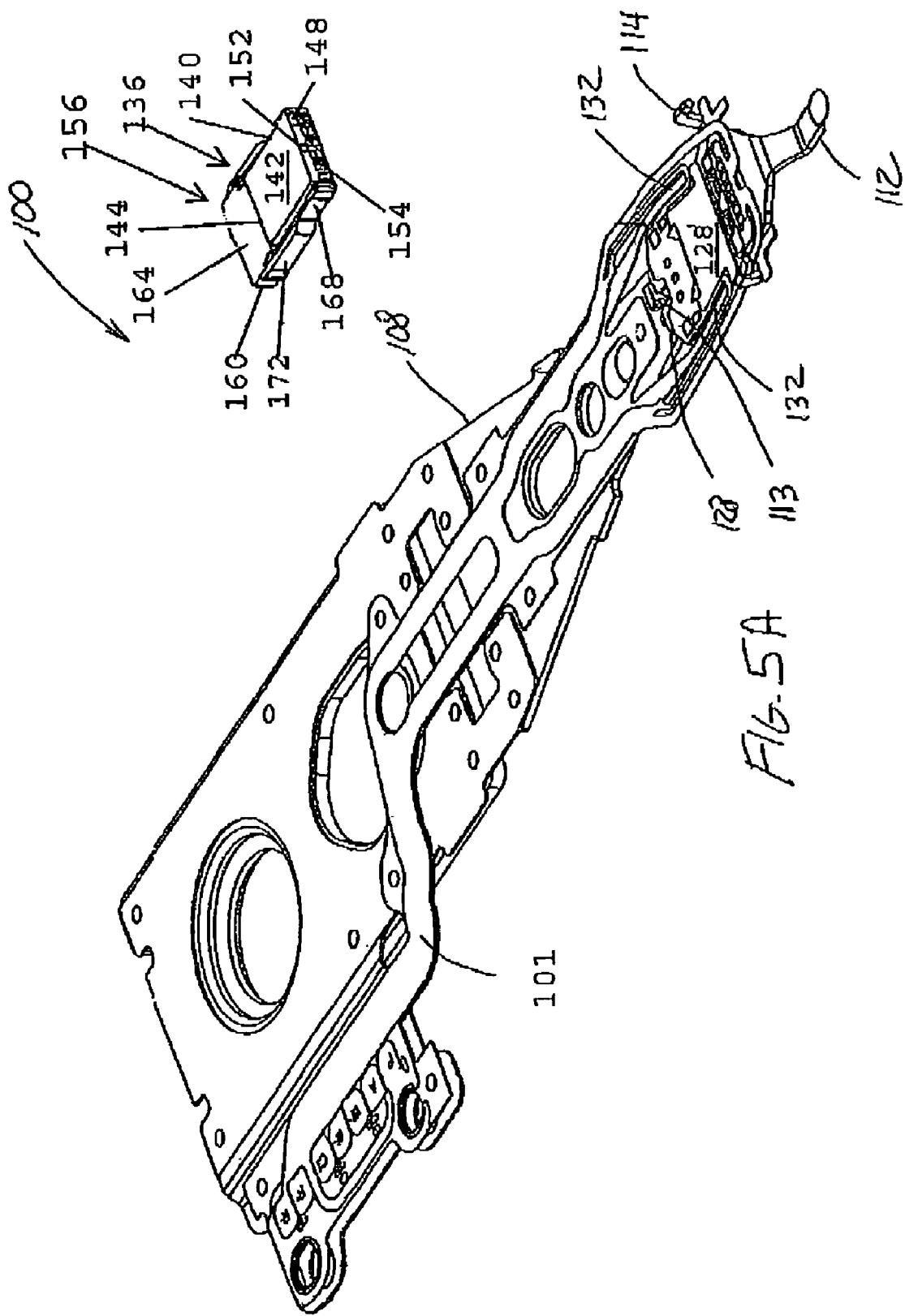
FIG. 5A is a perspective view of a head-gimbal assembly that may be used by the disk drive of FIG. 1.
Figure 5B:
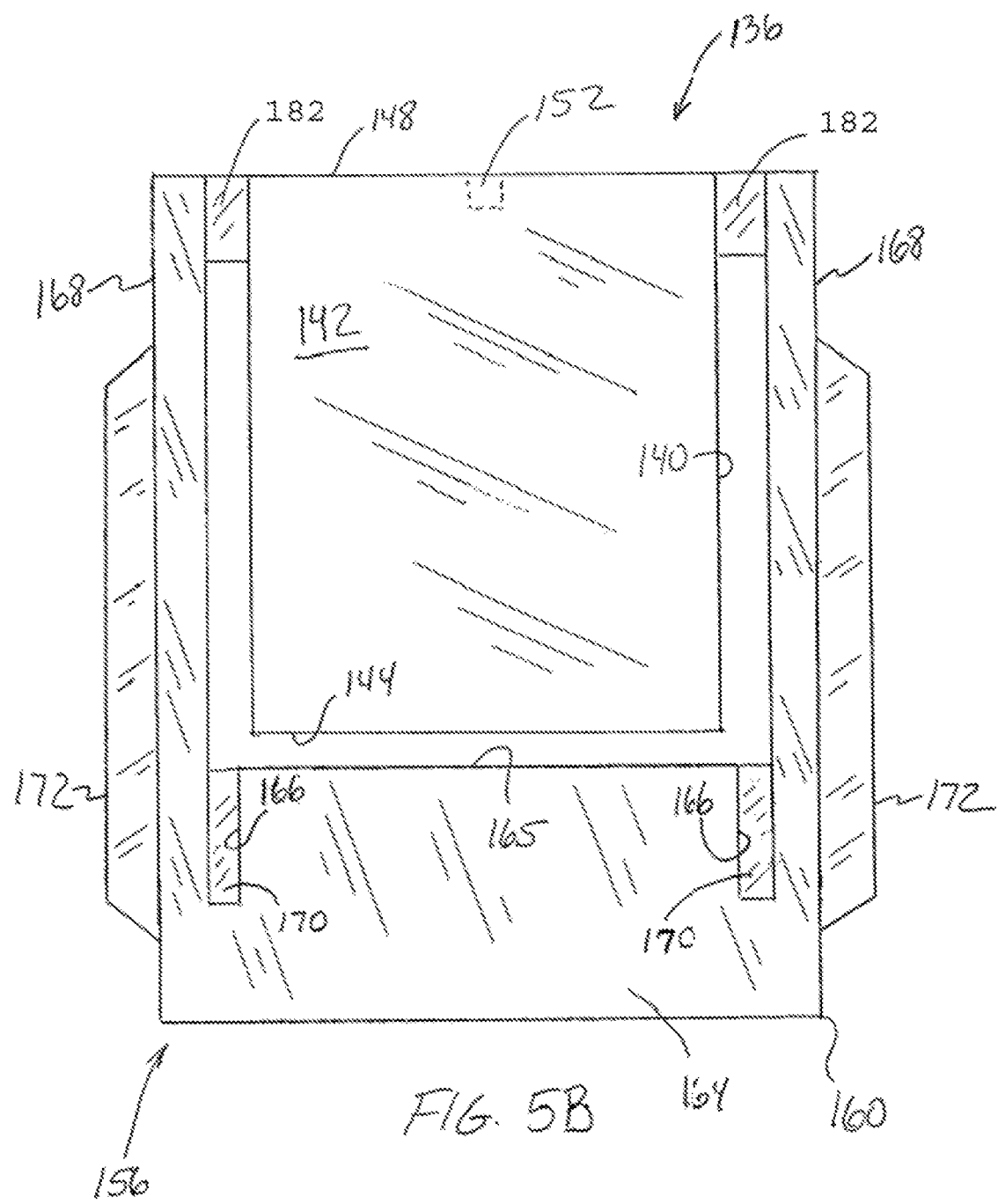
FIG. 5B is a bottom view of a disk drive slider positioner or slider position control microactuator used by the head-gimbal assembly of FIG. 5A.
Figure 5C:
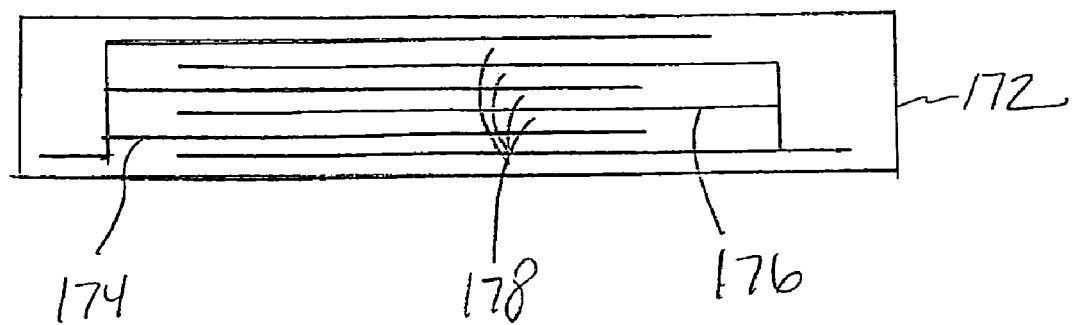
FIG. 5C is a schematic of one of the piezoelectric elements used by the disk drive slider positioner of FIGS. 5A-B.

An actuator 172 is provided for each of the arms 168 of the frame 160, and each is in the form of what may be characterized as a piezoelectric element (e.g., a plurality of piezoelectric layers 178, along with appropriate electrode layers (signal electrode layers 176 and ground electrode layers 174, as illustrated in FIG. 5C)). The actuators 172 may be operated to exert a force on their corresponding arm 168 to deflect the same relative to the base 164 of the frame 160. This of course changes the position of the slider 140 relative to the base 164 and flexure tongue 128, and more pertinently changes the position of its read/write head 152 relative to its corresponding data storage disk.

FIG. 5D is an enlarged view of the slider assembly 136 and other adjacent portions of the head-gimbal assembly 100. As previously noted, the flex cable 101 provides signals to and receives signals from the slider assembly 136. In this regard, the flex cable 101 includes a pair of microactuator trace sections 102 (each including one or more individual electrical traces (not shown in FIG. 6)) and corresponding microactuator bond pads 103 for communicating with the microactuator 156 of the slider assembly 136. A microactuator ball bond 186 electrically interconnects each microactuator bond pad 103 with a corresponding microactuator electrical terminal or connection pad 162 on the microactuator 156. The microactuator ball bond 186 should be a suitably electrically conductive material (e.g., gold), as it is part of the communication path to/from the microactuator 156. An appropriate electrical signal may be provided to the microactuator 156 via an electrical path that includes one or more electrical traces of a microactuator trace section 102, a corresponding microactuator bond pad 103, a corresponding microactuator ball bond 186, and a corresponding microactuator connection pad 162.

Continuing to refer to FIG. 5D, the flex cable 101 further includes a pair of slider trace sections 105 (each including one or more individual electrical traces (not shown in FIG. 5D)) and corresponding slider bond pads (not shown in FIG. 5D) for communicating with the slider 140, more specifically its read/write head 152. One or more electrical traces could also be incorporated into the slider trace sections 105 for providing a fly height control signal or any other relevant functionality that may be incorporated by the slider 140. In any case, a slider ball bond 184 electrically interconnects each slider bond pad of the flex cable 101 with a corresponding slider electrical terminal or connection pad 154 (e.g., FIG. 5A) on the slider 140. Each slider ball bond 184 should be a suitably electrically conductive material (e.g., solder), as it is part of the communication path to/from the slider 140. An appropriate electrical signal may be provided to or transmitted from the slider 140 via one or more electrical traces of a slider trace section 105, a corresponding slider bond pad of the flex cable 101, a corresponding slider ball bond 184, and a corresponding slider connection pad 154.

FIG. 5D also illustrates certain details regarding the flexure 115. Instead of the slider assembly 136 being mounted solely on the flexure tongue 128 of the flexure 115, the slider assembly 136 is also mounted on what may be characterized as a bond pad platform 130 of the flexure 115 that is spaced from the flexure tongue 128. Generally, the slider bond pads of the flex cable 101 that electrically communicate with the slider 140 are associated with the bond pad platform 130. Stated another way, a trailing portion of the slider 140 is associated with the bond pad platform 130, while a leading portion of the slider 140 is associated with the flexure tongue 128. Therefore, the only "interconnection" between the bond pad platform 130 and the flexure tongue 128 would be that one part of the slider assembly 136 is mounted on the flexure tongue 128 and a different part of the slider assembly 136 is mounted on the bond pad platform 130.

One embodiment of a prior art head-gimbal assembly is illustrated in FIGS. 6A-D and is identified by reference numeral 230. Generally, the head-gimbal assembly 230 includes a slider 208 that is mounted on a flexure 234, that in turn is mounted on a load beam or suspension 200. The slider 208 includes: an air bearing surface 212 that faces its corresponding data storage disk and that is contoured to allow the slider 208 to "fly" in spaced relation to this data storage disk; a mounting surface 214 that is opposite of the air bearing surface 212 and that faces a flexure tongue 242 of the flexure 234 when mounted thereon; a leading edge 210a; and a trailing edge 210b. A plurality of electrical contact pads 216 are provided on the trailing edge 210b of the slider 208 to provide electrical communication with the slider 208 (e.g., for electrical communication with its read/write head, a fly height control device).

A flex cable (not shown) would typically be disposed on the flexure 234, and would include a plurality of bond pads that are interconnected with the electrical contact pads 216 of the slider 208 by ball bonds 220. The flexure 234 includes a flexure tongue 242 that is flexibly supported relative to the suspension 200 by a pair of gimbal legs 226 of the flexure 234. The gimbal legs 226 are able to deflect relative to the suspension 200. The slider 208 is appropriately mounted on this flexure tongue 242. In this regard, two spacers 224 are appropriately mounted on the flexure tongue 242 to provide a small space between the slider 208 and the flexure tongue 242. An adhesive pad 246 is disposed between these spacers 224 to fix the slider 208 to the flexure tongue 242.

The flexure tongue 242 is a cantilever in that it is supported at only one end. That is, the flexure tongue 242 includes what may be characterized as a fixed end 244a and a free end 244b. The suspension 200 is biased toward its corresponding data storage disk, and as such the slider 208 is also biased toward this same data storage disk. The suspension 200 includes a dimple 204 that engages the slider 208 during disk drive operations, where its leading edge 210a may be disposed further from its corresponding data storage disk that its trailing edge 210b.

One embodiment of a head-gimbal assembly is illustrated in FIGS. 7A-D and is identified by reference numeral 250. The head-gimbal assembly 250 uses the suspension 200 and slider 208 discussed above. However, the head-gimbal assembly 250 includes a thermally-compensating flexure 254 to interconnect the suspension 200 and slider 208. The flexure 254 includes what may be characterized as a split flexure tongue 258 that is supported by a pair of gimbal legs 226, and that is in the form of a cantilever having what may be characterized as a fixed end 260a and a free end 260b. The flexure tongue 258 includes a leading edge section 262, a slider decoupling section 264, and a trailing edge section 266. The slider decoupling section 264 is disposed between the trailing edge section 266 and the leading edge section 262 along a length dimension 256 of the flexure tongue 258. Stated another way, the leading edge section 262 and the trailing edge section 266 are disposed in spaced relation, but are interconnected by a pair of connectors 268 of the flexure tongue 258. These connectors 268 thereby extend through and are part of the slider decoupling section 264, and are separately fixed to each of the leading edge section 262 and the trailing edge section 266. Both the leading edge section 262 and trailing edge section 266 are more rigid than each of the connectors 268, at least in a dimension corresponding with a normal to the corresponding data storage disk or along the length dimension 256. In one embodiment, the leading edge section 262 and trailing edge section 266 are stainless steel, while the connectors 268 are polyimide. In one embodiment, each of the connectors 268 is thinner than each of the leading edge section 262 and the trailing edge section 266.

The leading edge 210a of the slider 208 is aligned with the leading edge section 262 of the flexure tongue 258, while the trailing edge 210b of the slider 208 is aligned with the trailing edge section 266 of the flexure tongue 258. That is, the slider 208 does not extend beyond the fixed end 260a or the free end 260b of the flexure tongue 258. Generally, a leading portion of the slider 208 is supported by the leading edge section 262 of the flexure tongue 258, while a trailing portion of the slider 208 is supported by the trailing edge section 266 of the flexure tongue 258. An intermediate portion of the slider 208 (that which is aligned with the slider decoupling section 264) is not appreciably supported by the flexure tongue 258. Instead, the flexure tongue 258 includes an aperture or opening (the region between the connectors 268) that extends completely through the flexure tongue 258 and that is aligned with an intermediate portion of the slider 208. Stated another way, the intermediate portion of the slider 208 is aligned with an open area of the flexure tongue 258.

A spacer 224 is fixed to each of the leading edge section 262 and the trailing edge section 266 to provide a space between the slider 208 and the flexure tongue 258. A pair of adhesive pads 228 is disposed between these spacers 224 to fix the slider 208 to the flexure tongue 258. One adhesive pad 228 is associated with the leading edge section 262 of the flexure tongue 258, while the other adhesive pad 228 is associated with the trailing edge section 266 of the flexure tongue 258. In one embodiment, the slider decoupling section 264 is not fixed in any manner to the slider 208.

The flexure tongue 258 reduces the magnitude of positive crowning of the slider 208 (a curvature along the length dimension 256) by reducing the amount of interaction between the slider 208 and the flexure tongue 258. The configuration of the flexure tongue 258 that provides this reduction is subject to a number of characterizations. One is that the area of the surface of the slider decoupling section 264 that faces the slider 208 is less than both the area of the surface of the leading edge section 262 that faces the slider 208 and the area of the surface of the trailing edge section 266 that faces the slider 208. Another is that the area of a projection of the mounting surface 214 of the slider 208 onto the slider decoupling section 264 is less than both the area of a projection of the mounting surface 214 of the slider 208 onto the leading edge section 262 of the flexure tongue 258 and the area of a projection of the mounting surface 214 of the slider 208 onto the trailing edge section 266 of the flexure tongue 258. Yet another is that less than the entirety of the mounting surface 214 of the slider 208 interacts with the flexure tongue 258, even though the slider 208 does not extend beyond the fixed end 260a or the free end 260b of the flexure tongue 258.

Another embodiment of a head-gimbal assembly is illustrated in FIGS. 8A-D and is identified by reference numeral 270. The head-gimbal assembly 270 uses the suspension 200 and slider 208 discussed above. However, the head-gimbal assembly 250 includes a thermally-compensating flexure 274 to interconnect the suspension 200 and slider 208. The flexure 274 includes what may be characterized as a split flexure tongue 278 that is supported by a pair of gimbal legs 226, and that is in the form of a cantilever having a fixed end 280a and a free end 280b. The flexure tongue 278 includes a leading edge section 282, a slider decoupling section 284, and a trailing edge section 286. The slider decoupling section 284 is disposed between the trailing edge section 286 and the leading edge section 282 along a length dimension 276 of the flexure tongue 278. Stated another way, the leading edge section 282 and the trailing edge section 286 are disposed in spaced relation, but are interconnected by a connector 290. This connector 290 thereby extends through and is part of the slider decoupling section 284, and is located along the centerline of the flexure tongue 278. Both the leading edge section 282 and trailing edge section 286 are more rigid than the connector 290, at least in a dimension corresponding with a normal to the corresponding data storage disk or along the length dimension 276. In one embodiment, the leading edge section 282, the trailing edge section 286, and the connector 290 are stainless steel, are integrally formed, and are coplanar structures in an un-deformed state.

The leading edge 210a of the slider 208 is aligned with the leading edge section 282 of the flexure tongue 278, while the trailing edge 210b of the slider 208 is aligned with the trailing edge section 286 of the flexure tongue 278. That is, the slider 208 does not extend beyond the fixed end 280a or the free end 280b of the flexure tongue 278. Generally, a leading portion of the slider 208 is supported by the leading edge section 282 of the flexure tongue 258, while a trailing portion of the slider 208 is supported by the trailing edge section 286 of the flexure tongue 278. An intermediate portion of the slider 208 (that which is aligned with the slider decoupling section 284) is not appreciably supported by the flexure tongue 278. Instead, the flexure tongue 278 includes an aperture or opening (the regions along each side of the connector 290) that extends completely through the flexure tongue 278 and that is aligned with an intermediate portion of the slider 208. Stated another way, the intermediate portion of the slider 208 is aligned with an open area of the flexure tongue 278.

A spacer 224 is fixed to each of the leading edge section 282 and the trailing edge section 286 to provide a space between the slider 208 and the flexure tongue 278. A pair of adhesive pads 228 is disposed between these spacers 224 to fix the slider 208 to the flexure tongue 278. One adhesive pad 228 is associated with the leading edge section 282 of the flexure tongue 278, while the other adhesive pad 228 is associated with the trailing edge section 286 of the flexure tongue 278. In one embodiment, the slider decoupling section 284 is not fixed in any manner to the slider 208.

The flexure tongue 278 reduces the magnitude of positive crowning of the slider 208 (a curvature along the length dimension 276) by reducing the amount of interaction between the slider 208 and the flexure tongue 278. The configuration of the flexure tongue 278 that provides this reduction is subject to a number of characterizations. One is that the area of the surface of the slider decoupling section 284 that faces the slider 208 is less than both the area of the surface of the leading edge section 282 that faces the slider 208 and the area of the surface of the trailing edge section 286 that faces the slider 208. Another is that the area of a projection of the mounting surface 214 of the slider 208 onto the slider decoupling section 284 is less than both the area of a projection of the mounting surface 214 of the slider 208 onto the leading edge section 282 of the flexure tongue 278 and the area of a projection of the mounting surface 214 of the slider 208 onto the trailing edge section 286 of the flexure tongue 278. Yet another is that less than the entirety of the mounting surface 214 of the slider 208 interacts with the flexure tongue 278, even though the slider 208 does not extend beyond the fixed end 280a or the free end 280b of the flexure tongue 278.

Another embodiment of a head-gimbal assembly is illustrated in FIGS. 9A-D and is identified by reference numeral 300. The head-gimbal assembly 300 uses the suspension 200 and slider 208 discussed above. However, the head-gimbal assembly 300 includes a thermally-compensating flexure 304 to interconnect the suspension 200 and slider 208. The flexure 304 includes what may be characterized as a split flexure tongue 308 that is supported by a pair of gimbal legs 226, and that is in the form of a cantilever having what may be characterized as a fixed end 310a and a free end 310b. The flexure tongue 308 includes a leading edge section 312, a slider decoupling section 314, and a trailing edge section 316. The slider decoupling section 314 is disposed between trailing edge section 316 and the leading edge section 312 along a length dimension 306 of the flexure tongue 308. Stated another way, the leading edge section 312 and the trailing edge section 316 are disposed in spaced relation, but are interconnected by a pair of connectors 320 of the flexure tongue 308. More specifically, a central portion of each of the leading edge section 312 and the trailing edge section 316 are disposed in spaced relation, namely by the inclusion of a window 324 in the flexure tongue 308. The pair of connectors 320 structurally interconnect the leading edge section 312 and the trailing edge section 316 along the sides of the flexure tongue 308 in the illustrated embodiment. Both the leading edge section 312 and trailing edge section 316 are more rigid than each of the connectors 320, at least in a dimension corresponding with a normal to the corresponding data storage disk or along the length dimension 306. In one embodiment, the leading edge section 312, the trailing edge section 316, and the connectors 320 are stainless steel, are integrally formed (no joint between these structures), and are coplanar structures in an un-deformed state.

The leading edge 210a of the slider 208 is aligned with the leading edge section 312 of the flexure tongue 308, while the trailing edge 210b of the slider 208 is aligned with the trailing edge section 316 of the flexure tongue 308. That is, the slider 208 does not extend beyond the fixed end 310a or the free end 310b of the flexure tongue 308. Generally, a leading portion of the slider 208 is supported by the leading edge section 312 of the flexure tongue 308, while a trailing portion of the slider 208 is supported by the trailing edge section 316 of the flexure tongue 308. An intermediate portion of the slider 208 (that which is aligned with the slider decoupling section 314) is not appreciably supported by the flexure tongue 308. Instead, the flexure tongue 308 includes the noted window 324 that extends completely through the flexure tongue 308 and that is aligned with an intermediate portion of the slider 208. Stated another way, the intermediate portion of the slider 208 is aligned with an open area of the flexure tongue 308.

A spacer 224 is fixed to each of the leading edge section 312 and the trailing edge section 316 to provide a space between the slider 208 and the flexure tongue 308. A pair of adhesive pads 228 is disposed between these spacers 224 to fix the slider 308 to the flexure tongue 308. One adhesive pad 228 is associated with the leading edge section 312 of the flexure tongue 308, while the other adhesive pad 228 is associated with the trailing edge section 316 of the flexure tongue 308. In one embodiment, the slider decoupling section 314 is not fixed in any manner to the slider 208.

The flexure tongue 308 reduces the magnitude of positive crowning of the slider 208 (a curvature along the length dimension 306) by reducing the amount of interaction between the slider 208 and the flexure tongue 308. The configuration of the flexure tongue 308 that provides this reduction is subject to a number of characterizations. One is that the area of the surface of the slider decoupling section 314 that faces the slider 208 is less than both the area of the surface of the leading edge section 312 that faces the slider 208 and the area of the surface of the trailing edge section 316 that faces the slider 208. Another is that the area of a projection of the mounting surface 214 of the slider 208 onto the slider decoupling section 314 is less than both the area of a projection of the mounting surface 214 of the slider 208 onto the leading edge section 312 of the flexure tongue 308 and the area of a projection of the mounting surface 214 of the slider 208 onto the trailing edge section 316 of the flexure tongue 308. Yet another is that less than the entirety of the mounting surface 214 of the slider 208 interacts with the flexure tongue 308, even though the slider 208 does not extend beyond the fixed end 310a or the free end 310b of the flexure tongue 308.

Another embodiment of a head-gimbal assembly is illustrated in FIGS. 10A-D, is a variation of the head-gimbal assembly 250 of FIGS. 7A-D, and is identified by reference numeral 250'. Corresponding components of these two embodiments are identified by the same reference numeral. Those corresponding components that differ in at least some respect are further identified by a "single prime" designation. The primary difference between the head gimbal assembly 250' of FIGS. 10A-D and the head-gimbal assembly 250 of FIGS. 7A-D, is that the trailing edge section 266' of the flexure tongue 258' of the flexure 254' is wider than the leading edge section 262 of the flexure tongue 258'. This variation may also be utilized by the head-gimbal assembly 270 of FIGS. 8A-D (i.e., the trailing edge section 286 may be wider than the leading edge section 282), as well as by the head-gimbal assembly 300 of FIGS. 9A-D (i.e., the trailing edge section 316 may be wider than the leading edge section 312).

Another embodiment of a head-gimbal assembly is illustrated in FIGS. 11A-D, is a variation of the prior art head-gimbal assembly 230 of FIGS. 6A-D, and is identified by reference numeral 230'. Corresponding components of these two embodiments are identified by the same reference numeral. Those corresponding components that differ in at least some respect are further identified by a "single prime" designation. The primary difference between the head gimbal assembly 230' of FIGS. 11A-D and the head-gimbal assembly 230 of FIGS. 6A-D, is that the head-gimbal assembly 230' of FIGS. 11A-D uses a pair of adhesive lines 328 versus the adhesive pad 246 used by the head-gimbal assembly 330 of FIGS. 6A-D. The adhesive lines 328 may be disposed close to the leading edge 210a and trailing edge 210b of the slider 208, and are disposed at least generally perpendicular to the length dimension 240 of the flexure tongue 242 (other orientations may be appropriate). One or more adhesive lines 328 could be used to mount the slider to one or both of the flexure tongue sections in any of the embodiments of FIGS. 7A-D, 8A-D, 9A-D, and 10A-D.

Figure 12A:
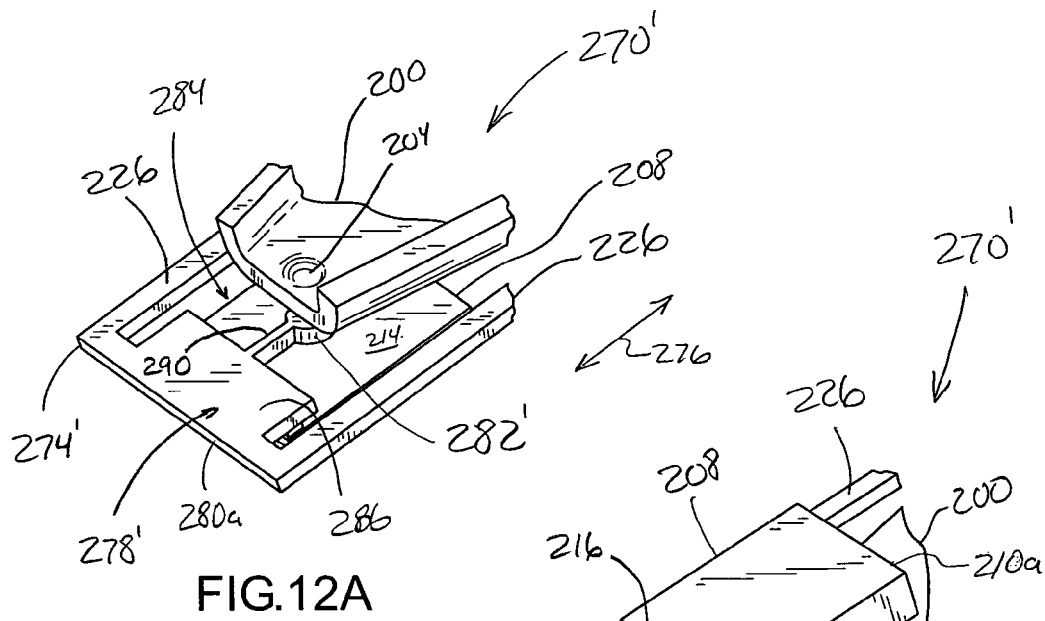
FIG. 12A is a perspective schematic of one side of a head-gimbal assembly having a fifth embodiment of a thermally-compensating flexure.
Figure 12B:
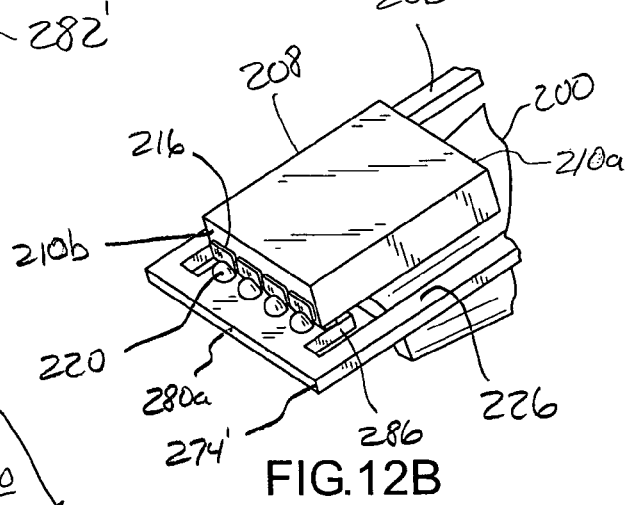
FIG. 12B is a perspective schematic of an opposite side of the head-gimbal assembly from that shown in FIG. 12A.
Figure 12C:
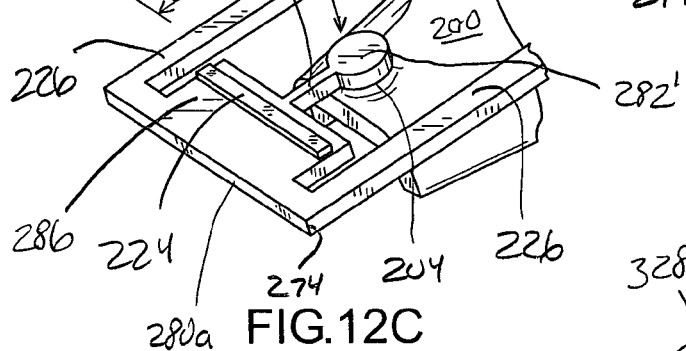
FIG. 12C is a perspective schematic of the same side of the head-gimbal assembly shown in FIG. 12B, but without the slider.
Figure 12D:
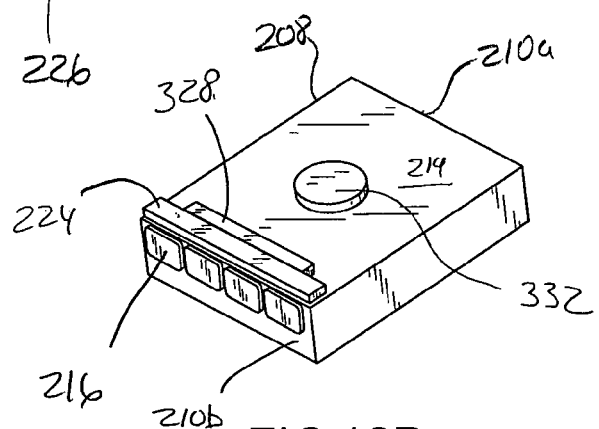
FIG. 12D is a perspective schematic of the side of the slider that faces the side of the flexure tongue shown in FIG. 12C.

Another embodiment of a head-gimbal assembly is illustrated in FIGS. 12A-D, is a variation of the head-gimbal assembly 270 of FIGS. 8A-D, and is identified by reference numeral 270'. Corresponding components of these two embodiments are identified by the same reference numeral. Those corresponding components that differ in at least some respect are further identified by a "single prime" designation. The primary difference between the head gimbal assembly 270' of FIGS. 12A-D and the head-gimbal assembly 270 of FIGS. 8A-D is that the leading edge section 282' of the flexure tongue 278' of the flexure 274' of FIGS. 12A-D is smaller than the leading edge section 282 of the flexure tongue 278 of the flexure 274 of FIGS. 8A-D. More specifically, the leading edge section 282' is about the same size as the dimple 204 of the suspension 200. Stated another way, the perimeter of the leading edge section 282' and the perimeter of the dimple 204 are at least generally aligned. FIG. 12D also illustrates that an adhesive pad 332 is used to fix the slider 208 to the leading edge section 282', and that an adhesive line 328 is used to fix the slider 208 to the trailing edge section 286 of the flexure tongue 278'. The spacer 224 that is attached to the trailing edge section 286 of the flexure tongue 278' is also shown in FIG. 12D.

The embodiments of FIGS. 7A-D, 8A-D, 9A-D, 10A-D, and 12A-D each provide a reduced interface between the respective flexure tongue and the slider 208. This is believed to reduce the ability of the flexure tongue to deform the slider 208 because of thermal effects. This reduced interface may be defined in relation to what may be characterized as a flexure tongue maximum footprint that is in the form of a rectangle having a width that is equal to the maximum width of the flexure tongue and a length that is equal to the maximum length of the flexure tongue. The area of the surface of each of these flexure tongues that faces the slider 208 is no more than about 50% of the area of the corresponding flexure tongue maximum footprint (i.e., the area of the reference rectangle) in one embodiment. In another embodiment, the area of the surface of each of these flexure tongues that faces the slider 208 is within a range of about 10% to about 50% of the area of the corresponding flexure tongue maximum footprint (i.e., the area of the reference rectangle).

Figure 13A:
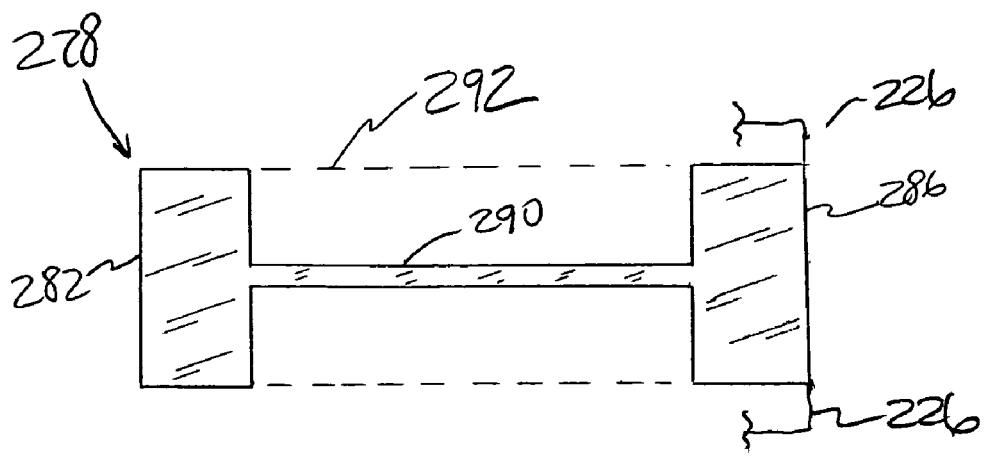
FIG. 13A is plan view of the surface of the flexure tongue of FIGS. 8A-D that faces the slider, and which quantifies a reduction of the area of this surface.
Figure 13B:
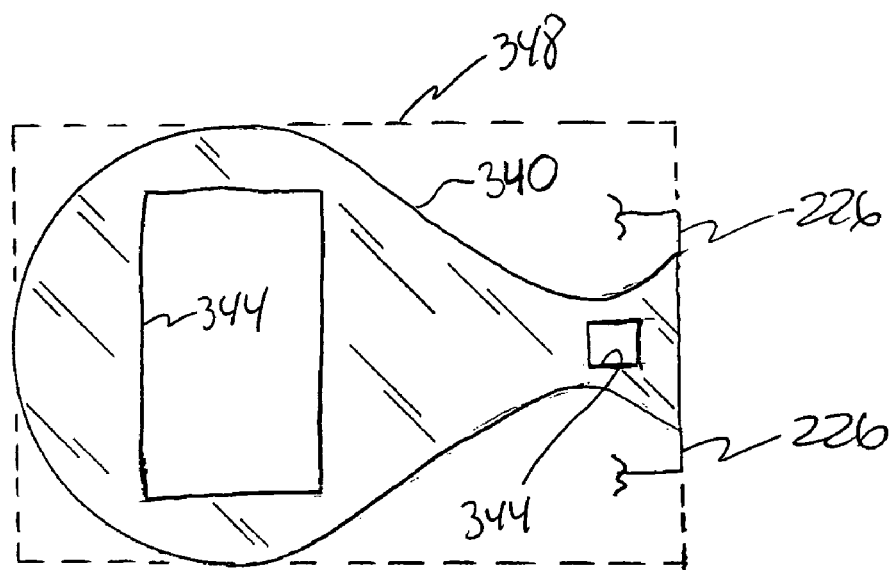
FIG. 13B is a plan view of another embodiment of a flexure tongue with a reduced slider interface area, and which quantifies this reduction.

FIGS. 13A and 13B illustrate two thermally-compensating flexure tongue designs in accordance with the foregoing. FIG. 13A illustrates the flexure tongue 278 in relation to its flexure tongue maximum footprint 292 (parts thereof not defined by the perimeter of the flexure tongue 278 being shown by a dashed line). The shaded surface of the flexure tongue 278 is no more than 50% of the area of its flexure tongue maximum footprint 292 in accordance with the foregoing.

FIG. 13B presents yet another embodiment of a thermally-compensating flexure tongue that is identified by reference numeral 340 and that is a cantilevered structure. This flexure tongue 340 has a curved perimeter (the perimeter could be of any appropriate shape), and includes a pair of openings 344 that extend completely through the flexure tongue 340. Any number of openings 344 could be used and in any appropriate arrangement, each being of any appropriate size, shape, and configuration. What is of importance in relation to the flexure tongue 340 is that the area of the shaded surface of the flexure tongue 340 (which faces the slider when it is mounted on the flexure tongue 340) is no more than about 50% of the area of its corresponding flexure tongue maximum footprint 348 in accordance with the foregoing.

Flexure tongues that provide a reduced interface with the slider by having the area of the interfacing surface being no more than about 50% of the corresponding flexure tongue maximum footprint may be used with a slider of any appropriate size. The perimeter of the slider may be entirely within the perimeter of the flexure tongue. However, the slider could be wider than one or more portions of the flexure tongue, the leading edge of the slider could extend beyond the flexure tongue, the trailing edge of the slider could extend beyond the flexure tongue, or any combination thereof.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A disk drive head-gimbal assembly, comprising:
    a flexure comprising:
        a flexure tongue in the form of a cantilever, wherein said flexure tongue comprises first and second flexure tongue sections that are spaced along a length dimension of said flexure tongue, as well as a first connector that extends between and structurally interconnects said first and second flexure tongue sections, wherein said first connector is less rigid than each of said first and second flexure tongue sections along a length dimension of said flexure tongue and the first connector is separately fixed to each of the first and second flexure tongue sections; and
    a slider fixed to each of said first and second flexure tongue sections and comprising leading and trailing edges, wherein said trailing edge is at least partially aligned with said first flexure tongue section, and wherein said leading edge is at least partially aligned with said second flexure tongue section.

2. The disk drive head-gimbal assembly of claim 1, wherein said first connector is not fixed to said slider.

3. The disk drive head-gimbal assembly of claim 1, further comprising a second connector that extends between and structurally interconnects said first and second flexure tongue sections.

4. The disk drive head-gimbal assembly of claim 3, wherein said second connector is separately fixed to each of said first and second flexure tongue sections.

5. The disk drive head-gimbal assembly of claim 1, further comprising adhesive between said slider and each of said first and second flexure tongue sections.

6. The disk drive head-gimbal assembly of claim 1, wherein said first flexure tongue section comprises a fixed end of said flexure tongue, and wherein said second flexure tongue section comprises a free end of said flexure tongue.

7. The disk drive head-gimbal assembly of claim 6, wherein said first flexure tongue section is wider than said second flexure tongue section.

8. The disk drive head-gimbal assembly of claim 1, wherein said flexure tongue further comprises a slider decoupling section disposed between said first and second flexure tongue sections proceeding along said length dimension, wherein said slider decoupling section comprises said first connector, wherein said second flexure tongue section comprises a free end of said flexure tongue, and wherein an area of a projection of said slider onto said slider decoupling section is less than an area of a projection of said slider onto each of said first and second flexure tongue sections.

9. A disk drive head-gimbal assembly, comprising:
    a flexure comprising:
        a flexure tongue in the form of a cantilever, wherein said flexure tongue comprises a first flexure tongue section,
        a slider decoupling section, and
        a second flexure tongue section, wherein said slider decoupling section is disposed between said first and second flexure tongue sections proceeding along a length dimension of said flexure tongue, and wherein said second flexure tongue section comprises a free end of said flexure tongue, the flexure tongue further comprising a first connector separately fixed to each of said first and second flexure tongue sections that extends between and structurally interconnects the first and second flexure tongue sections, wherein the slider decoupling section comprises the first connector;

a slider fixed to each of said first and second flexure tongue sections and comprising:

leading and trailing edges, wherein said trailing edge is at least partially aligned with said first flexure tongue section, wherein said leading edge is at least partially aligned with said second flexure tongue section, wherein an area of a projection of said slider onto said slider decoupling section is less than an area of a projection of said slider onto said first flexure tongue section, and wherein said area of said projection of said slider onto said slider decoupling section is less than an area of a projection of said slider onto said second flexure tongue section.

10. The disk drive head-gimbal assembly of claim 9, wherein said slider decoupling section is not fixed to said slider.

11. The disk drive head-gimbal assembly of claim 9, further comprising a second connector that extends between and structurally interconnects said first and second flexure tongue sections, wherein said slider decoupling section comprises said second connector.

12. The disk drive head-gimbal assembly of claim 11, wherein said second connector is separately fixed to each of said first and second flexure tongue sections.

13. The disk drive head-gimbal assembly of claim 11, wherein said first and second connectors and said first and second flexure tongue sections collectively define an aperture that extends completely through said flexure tongue.

14. The disk drive head-gimbal assembly of claim 9, further comprising adhesive between said slider and each of said first and second flexure tongue sections.

15. The disk drive head-gimbal assembly of claim 9, wherein said first flexure tongue section is wider than said second flexure tongue section.

16. The disk drive head-gimbal assembly of claim 9, further comprising a first spacer having about a same thickness as the first connector, the first spacer located on the first tongue section and a second spacer having about the same thickness as the first connector, the second spacer located on the second tongue section.

* * * * *